US008767845B2

(12) United States Patent
Kumar

(10) Patent No.: US 8,767,845 B2
(45) Date of Patent: Jul. 1, 2014

(54) INCREASED CAPACITY COMMUNICATION LINKS WITH SPECTRUM SHARING

(75) Inventor: Rajendra Kumar, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 700 days.

(21) Appl. No.: 12/660,617

(22) Filed: Mar. 2, 2010

(65) Prior Publication Data

US 2011/0216810 A1    Sep. 8, 2011

(51) Int. Cl.
*H04K 1/10* (2006.01)
*H04L 27/28* (2006.01)

(52) U.S. Cl.
USPC .............. 375/260; 370/464; 370/480; 455/60

(58) Field of Classification Search
None
See application file for complete search history.

(56) References Cited

U.S. PATENT DOCUMENTS

| | | | | |
|---|---|---|---|---|
| 5,894,473 A | * | 4/1999 | Dent | 370/342 |
| 6,487,398 B1 | * | 11/2002 | Nobbe et al. | 455/118 |
| 7,260,159 B2 | * | 8/2007 | Lee et al. | 375/329 |
| 7,817,743 B2 | * | 10/2010 | Stojanovic et al. | 375/295 |
| 8,055,234 B2 | * | 11/2011 | Mattisson et al. | 455/296 |
| 2004/0022229 A1 | * | 2/2004 | Vanness | 370/343 |
| 2007/0183310 A1 | * | 8/2007 | Nakamura | 370/208 |
| 2009/0052556 A1 | | 2/2009 | Fernandez | |

FOREIGN PATENT DOCUMENTS

| | | |
|---|---|---|
| GB | 2404533 A | 2/2005 |
| WO | WO 95/20277 A1 | 7/1995 |

OTHER PUBLICATIONS

International Search Report and Written Opinion of the International Searching Authority mailed in Application No. PCT/US2011/022595 on Jun. 29, 2011.

* cited by examiner

*Primary Examiner* — Shuwang Liu
*Assistant Examiner* — Gina McKie
(74) *Attorney, Agent, or Firm* — K & L Gates LLP

(57) ABSTRACT

Various embodiments are directed to systems and methods for processing signals comprising a first component and a second component. A bandwidth of the first component may be centered at a center frequency. A bandwidth of the second component may be offset from the center frequency by an offset frequency such that at least a portion of the bandwidth of the second component overlaps a skirt of the first component. In various embodiments, a transmitter may split a single signal to generate the first and second components, shift the frequency of the second component, recombine and transmit the two components. Also, in various embodiments, a receiver may receive the signal and derive the first and second components by correcting for cross-interference.

22 Claims, 23 Drawing Sheets

US 8,767,845 B2

INCREASED CAPACITY COMMUNICATION LINKS WITH SPECTRUM SHARING

STATEMENT OF GOVERNMENT INTEREST

This invention was made with government support under Contract No. FA8802-09-C-0001 awarded by the Department of the United States Air Force. The government has certain rights in the invention.

BACKGROUND

There is great demand for high capacity communication links in a variety of industrial and government settings including, for example, in mobile telephony, satellite communications, broadband data communications, etc. Existing methods for increasing the capacity (e.g., the data rate) of a communications link suffer from high costs, high power requirements, and the limited availability of bandwidth. For example, it is known to increase communications link capacity using higher-order modulation techniques such as, for example, 16 QAM. Successfully implementing higher-order modulation techniques, however, requires a relatively high bit energy to noise spectral density ratio ($E_b/N_o$) and linear power amplifiers. High values for $E_b/N_o$ require increased transmission power. Operating a power amplifier in a linear manner, however, often requires an increased power back-off. Accordingly, the use of higher-order modulation techniques is often unsatisfactory. This is especially the case in communications links with severe power constraints, such as, for example, high capacity satellite links. It is also known, for example, in the commercial television industry, that increased communications link capacity can be obtained using power division multiple accessing (PDMA). According to PDMA, two or more signals may occupy the same spectrum bandwidth. At least one of the signals, however, must have a relatively higher power level, typically 10 dB or more depending on the number of signals. Again, power constraints often render these methods undesirable.

SUMMARY

Various embodiments are directed to systems and methods for increasing the capacity of a communications link by intentionally overlapping the spectrums of a main wideband signal and one or more narrowband signals. The narrowband signal or signals may have center frequencies offset from the center frequency of the wideband signal such that the signal spectrums overlap. According to various embodiments, the narrowband signal or signals may be spectrally positioned completely or partially within a skirt region of the wideband signal's spectrum. Accordingly, significant portions of the resulting interference effects between the signals may be removed by filtering. Additional interference may be removed from the wideband signal by detecting the narrowband signal or signals, estimating the interference caused to the wideband signal from the narrowband signal or signals, and compensating for the narrowband signal interference. In various embodiments, a similar process may be implemented to remove additional interference from the narrowband signals due to the wideband signal. According to various embodiments, the wideband signal and the narrowband signal or signals may be transmitted from the same transmitter/location, or from different transmitters/locations.

FIGURES

Various embodiments of the present invention are described here by way of example in conjunction with the following figures, wherein.

DESCRIPTION

Figure 1:
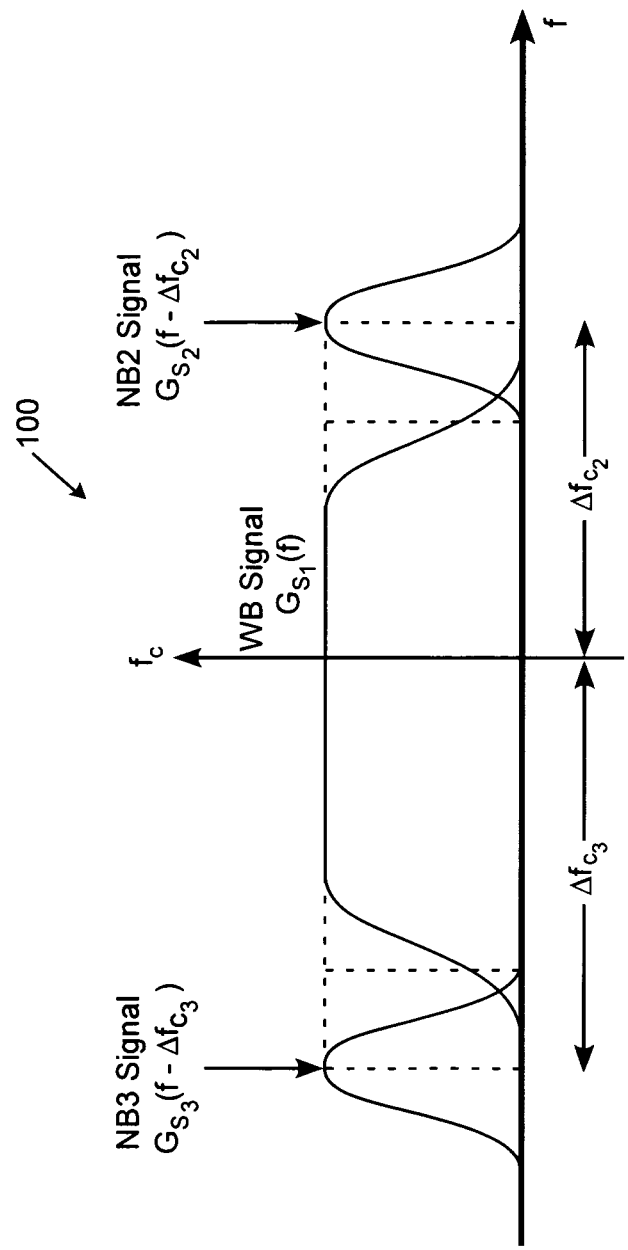
FIG. 1 illustrates one embodiment of a chart showing frequency domain representations of a wideband signal and two narrowband signals.

Various embodiments are directed to systems and methods for increasing the capacity of a communications link by intentionally overlapping the spectrums of a main wideband signal and one or more narrowband signals. FIG. 1 illustrates one embodiment of a chart 100 showing frequency domain representations (e.g., spectrums or spectrum distributions) of a wideband signal WB and two narrowband signals NB2 and NB3 having overlapping frequency spectrums. The frequency domain representations of the WB, NB2 and NB3 signals are indicated as Gs1($f$), Gs2($f-\Delta f_{c2}$) and Gs3($f+\Delta f_{c3}$), respectively.

Prior to transmission, each of the signals WB, NB2, NB3 may be filtered with band-limiting square-root raised cosine (SRC) filters, thus causing the signals WB, NB2, NB3 to have skirts as shown. A skirt may be defined as a frequency band where a signal's power spectral density drops off from a predetermined portion of the peak power spectral density to zero (e.g., −∞ dB). For example, where the signal skirt begins at 6 dB from peak spectral power density, it may take up α % of the 6 dB bandwidth of the signal, where α is the roll-off factor of the SRC filter.

As illustrated in FIG. 1, the spectrums of the narrowband signals NB2, NB3 are frequency shifted by $\Delta f_{c2}$ and $\Delta f_{c3}$, respectively, from the center frequency ($f_c$) of the wideband signal. The frequency offsets $\Delta f_{c2}$ and $\Delta f_{c3}$ may be selected such that the spectrums of the narrowband signals NB2, NB3 overlap the spectrum of the wideband signal, as shown. According to various embodiments, and sometimes depending on the data rate of the signals NB2, NB3, the spectrums of the signals NB2, NB3 may be limited to within the skirt of the wideband signal WB, or may extend beyond the skirt of the wideband signal WB, as shown in FIG. 1.

According to various embodiments, the signals WB, NB2, NB3 may originate from separate transmitters that may be at separate physical locations. The transmitters may generate the signal spread shown in FIG. 1 by utilizing different carrier frequencies. For example, a transmitter for the narrowband signal NB2 may utilize a carrier frequency that is offset from the carrier frequency of the wideband signal transmitter by $\Delta f_{c2}$. A transmitter for the narrowband signal NB3 may utilize a carrier frequency that is offset from the carrier frequency of the wideband signal transmitter by $\Delta f_{c3}$.

Figure 2:
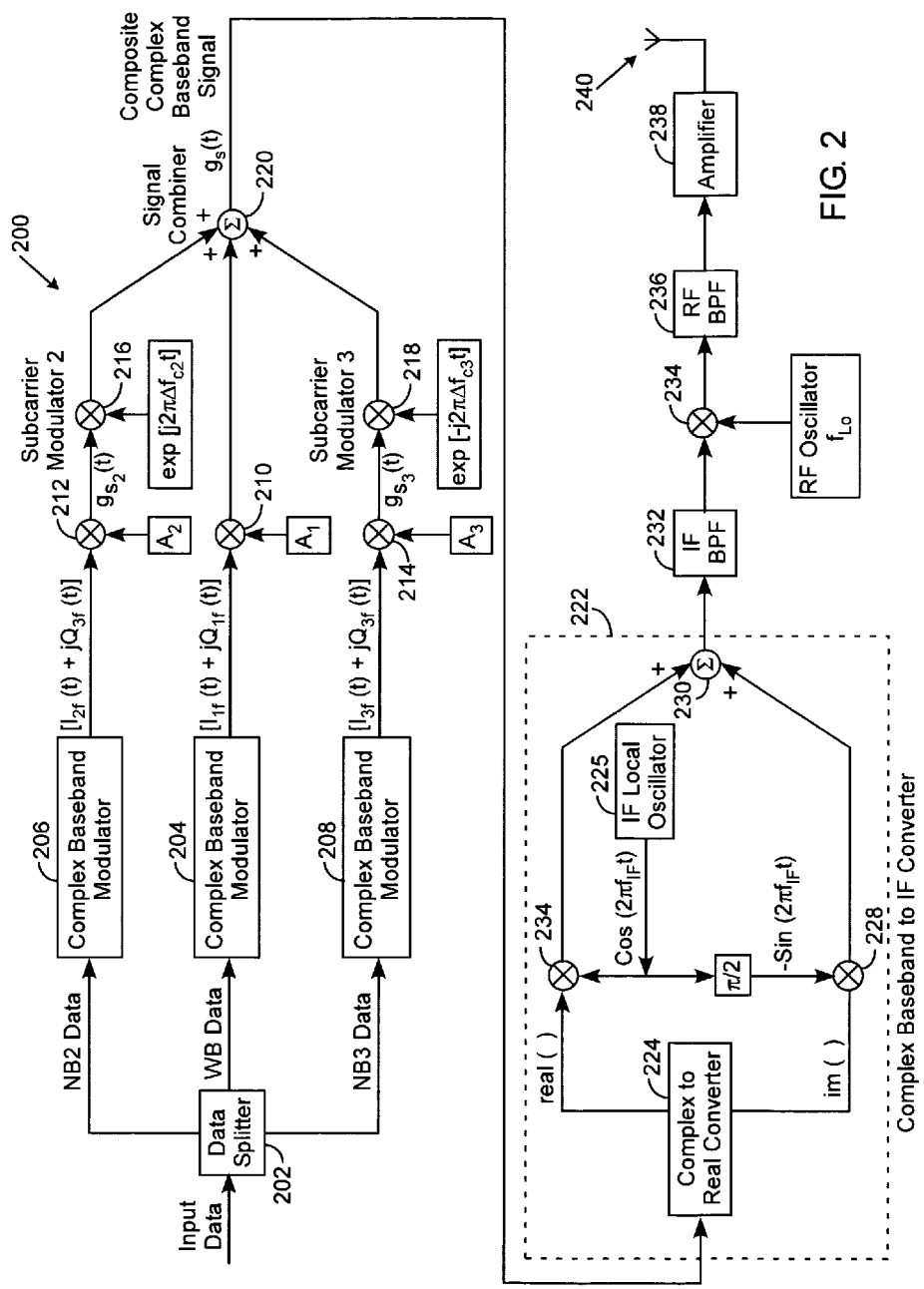
FIG. 2 illustrates one embodiment of a block diagram showing a transmitter for deriving and transmitting the wideband signal and narrowband signals of FIG. 1.

In various embodiments, the signals WB, NB2 and NB3 may originate from a single source. FIG. 2 illustrates one embodiment of a block diagram showing a transmitter 200 for deriving and transmitting the signals WB, NB2, NB3. An input binary data stream may be provided to a data splitter 202. The data splitter 202 may split the input stream into the signals WB, NB2 and NB3, as shown. The wideband signal WB may be modulated by a complex baseband modulator 204, resulting in a filtered complex signal:

$$I_{1f}(t)+jQ_{1f}(t) \quad (1)$$

In (1) and in the other equations herein, the letter 'j' may represent $\sqrt{-1}$ unless otherwise noted. The narrowband signals NB2, NB3 may, likewise, be modulated by complex baseband modulators 206 and 208, respectively, generating additional filtered complex signals given by (2) and (3) below:

$$I_{2f}(t)+jQ_{2f}(t) \quad (2)$$

$$I_{3f}(t)+jQ_{3f}(t) \quad (3)$$

The modulators 204, 206, 208, as well as other modulators and demodulators herein, are described in terms of Offset Quadrature Phase Shift Keying (OQPSK). It will be appreciated that any suitable modulators or modulation methods may be used including, for example, other types of phase-shift keying, amplitude-shift keying methods, frequency-shift keying methods, etc.

The filtered complex signals given by (1) (2) and (3) above may be scaled at nodes 210, 212 and 214 by scaling factors $A_1$, $A_2$ and $A_3$, respectively. The scaling factors $A_1$, $A_2$ and $A_3$ may be selected to appropriately apportion the amplifier power among the three signals WB, NB2, NB3. The output of the scaling nodes 210, 212, 214 may be a set of complex baseband signals, $g_{s1}(t)$, $g_{s2}(t)$, and $g_{s3}(t)$ corresponding to the wideband signal WB and the narrowband signals NB2, NB3, respectively. The complex baseband signals $g_{s2}(t)$ and $g_{s3}(t)$, corresponding to the narrowband signals NB2, NB3, may be input to subcarrier modulators 216, 218, respectively. Subcarrier modulator 216 may translate the frequency spectrum of the complex baseband signal $g_{s2}(t)$ by $\Delta f_{c2}$, resulting in:

$$g_{s2}(t)\exp[j2\pi\Delta f_{c2}t] \quad (4)$$

Likewise, subcarrier modulator 218 may translate the frequency spectrum of the complex baseband signal $g_{s3}(t)$ by $-\Delta f_{c3}$, resulting in:

$$g_{s3}(t)\exp[-j2\pi\Delta f_{c3}t] \quad (5)$$

The complex baseband signal, $g_{s1}(t)$, as well as those given by (4) and (5) above, may be combined at signal combiner 220 to generate a composite complex baseband signal $g_s(t)$.

The composite baseband signal $g_s(t)$ may be input to a complex baseband to intermediate frequency (IF) converter 222, which may up-convert signal $g_s(t)$ to the intermediate frequency. For example, a complex to real converter 224 may separate the composite baseband signal $g_s(t)$ into real and imaginary components. The real component may be modulated, at node 226, by the intermediate frequency signal, generated by an intermediate frequency oscillator 225. The imaginary component may be modulated by the intermediate frequency shifted by $\pi/2$. The real and imaginary signals may be summed at summing junction 230. The resulting intermediate frequency (IF) signal may be filtered at intermediate frequency bandpass filter 232 and multiplied by a signal $f_{lo}$ at node 234. The signal $f_{lo}$ may be selected according to Equation (6) such that the node 234 up-coverts the intermediate frequency signal to radio frequency (RF).

$$f_{lo}=f_c-f_{IF} \quad (6)$$

After RF bandpass filtering at 236, the resulting signal may be amplified at 238 and transmitted by antenna 240. Although FIG. 2 shows an OQPSK upconverter, it will be appreciated that an upconverter according to any suitable modulation technique may be used.

Figure 3:
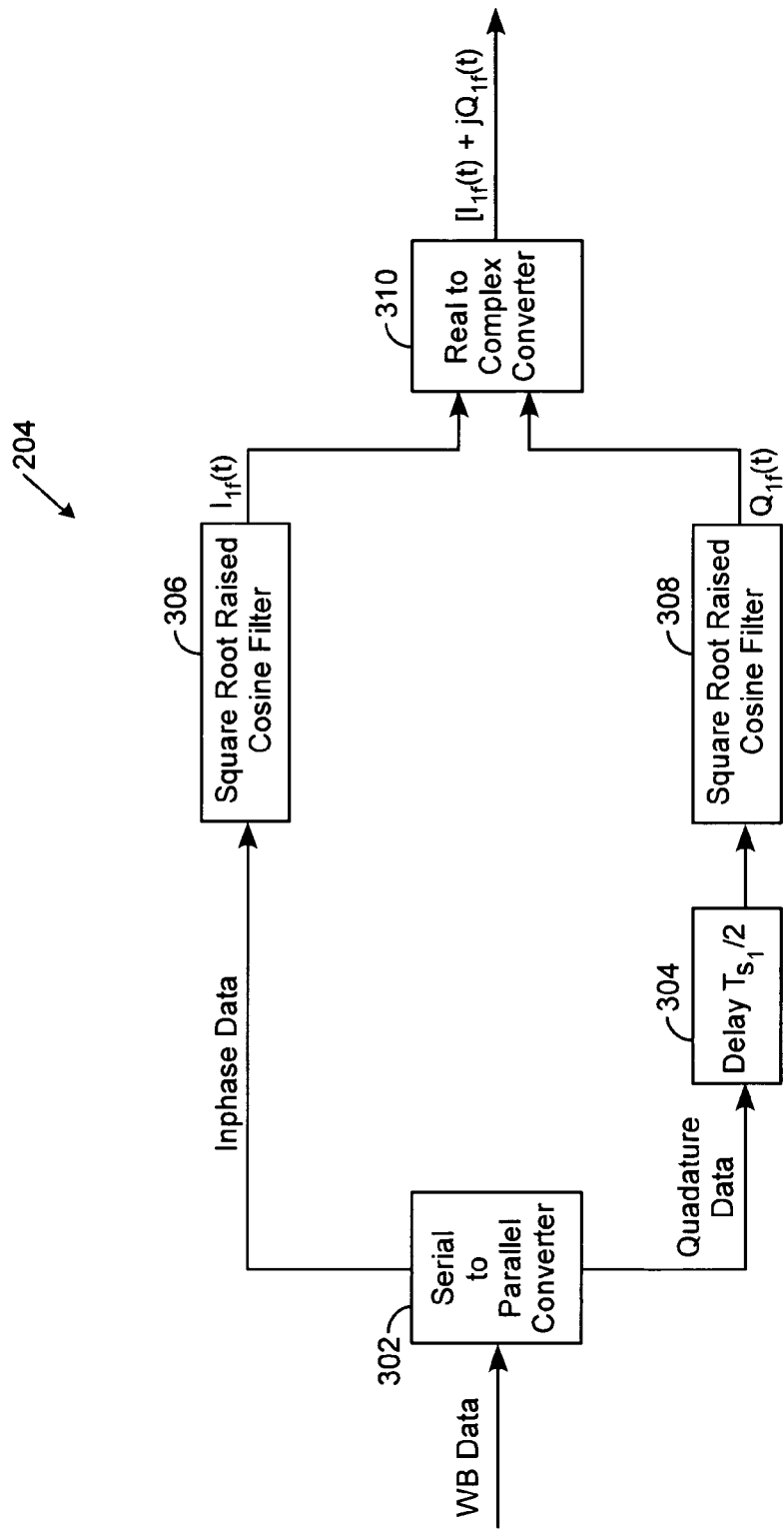
FIG. 3 illustrates one embodiment of the complex baseband modulator of FIG. 2.

FIG. 3 illustrates one embodiment of the complex baseband modulator 204. The complex baseband modulator 204 is illustrated and described as configured for OQPSK modulation. It will be appreciated, however, that the techniques described herein may be used with any suitable modulator or form of modulation. Also, although only the baseband modulator 204 is shown, it will be appreciated that the baseband modulators 206, 208 may operate in a similar manner. Referring back to FIG. 3, the WB signal may be input to a serial to parallel converter 302 with two outputs. A first output may be input to the square-root raised cosine filter 306 having a roll-off factor of α. The result may be a filtered in-phase signal denoted by $I_{1f}(t)$.

A second output may be delayed by a delay 304 equal to $T_{s1}/2$, wherein $T_{s1}$ is the symbol time for the WB signal. Accordingly, the second signal is offset by $T_{s1}/2$ in time with respect to the in-phase signal, making the second signal an offset quadature signal. The quadrature signal is then input to the square-root raised cosine filter 308, which may also have a roll-off factor of α. The result may be a filtered quadrature signal denoted by $Q_{1f}(t)$. The in-phase and quadrature signals may be input to a real-to-complex converter 310, which may output the filtered complex signal given by (1) above and described in FIG. 2.

Figure 4:
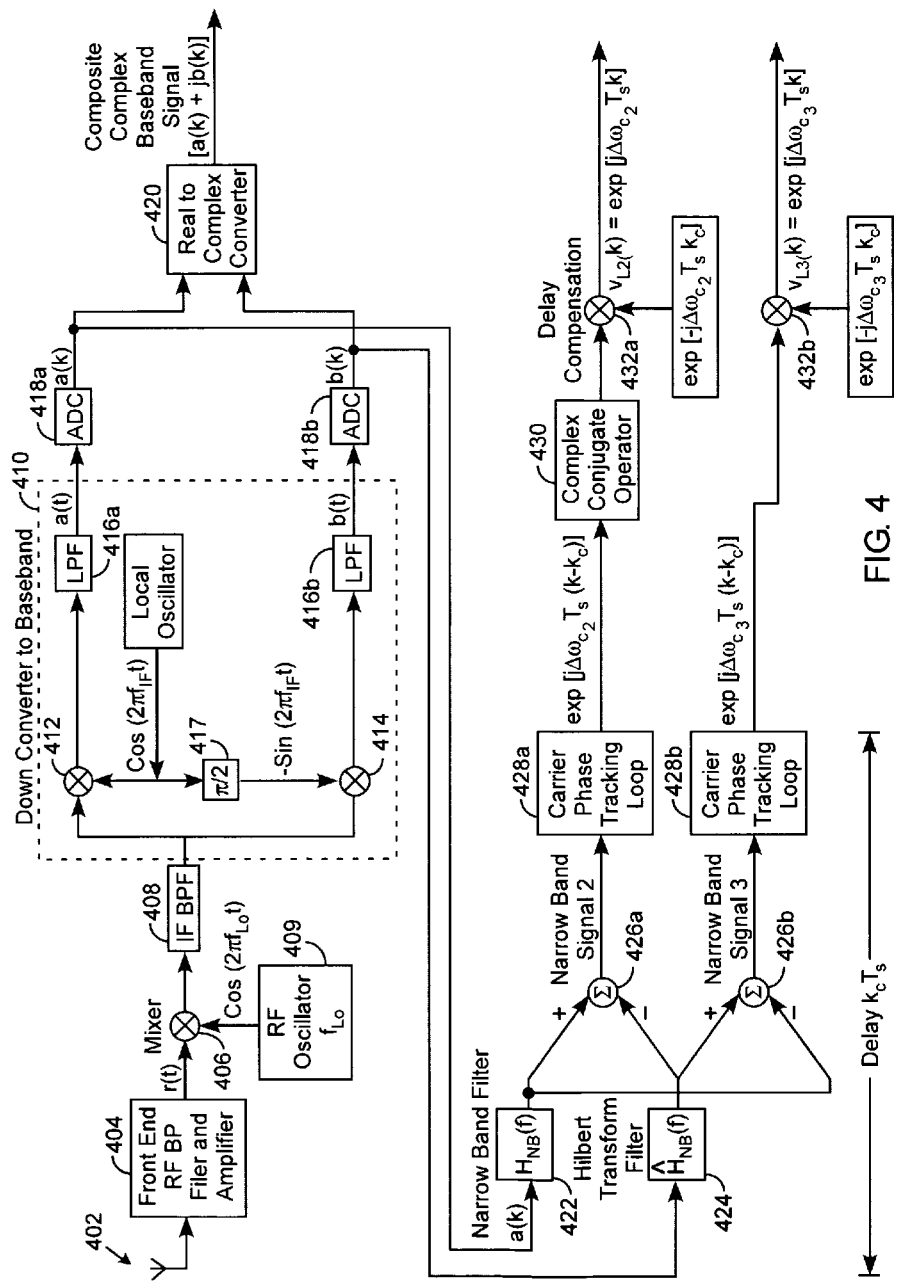
FIG. 4 illustrates one embodiment of a front end of a receiver for receiving and demodulating an overlapping signal, such as the signal shown in FIG. 1.

FIG. 4 illustrates one embodiment of a front end module 400 of a receiver for receiving and demodulating an overlapping signal, such as the signal 100 shown in FIG. 1. The signal may be received via antenna 402. The received signal may be filtered and amplified by the front end RF band pass filter and amplifier 404. The resulting signal, r(t) is given by Equation (7):

$$r(t) = v_{RF}(t) + n(t) \quad (7)$$
$$= \mathrm{Re}\{g_s(t)e^{j2\pi f_c t}\} + n(t)$$
$$= v_{RF1}(t) + v_{RF2}(t) + v_{RF3}(t) + n(t)$$

In Equation (7), Re( ) represents an operator that takes the real part of its argument; $g_s(t)$ may denote the complex envelope of the RF band pass signal; $f_c$ may be the carrier frequency; and n(t) may denote the sum of the receiver additive noise and any other possible external interference. The signal $v_{RF}(t)$ may be comprised of three band pass signals, as illustrated in FIG. 1. For example, the signal $v_{RF}(t)$ may comprise a relative wideband signal (WB) and a pair of narrowband signals (NB2, NB3) which are offset in their center frequency from the WB signal by $\Delta f_{c2}$ and $-\Delta f_{c3}$, respectively. Accordingly, the complex envelope signal $g_s(t)$ may be expressed as shown in Equations (8) and (9):

$$g_s(t) = v_1(t) + v_2(t) + v_3(t) = g_{s_1}(t) + g_{s_2}(t)\exp\{j2\pi\Delta f_{c2}t\} + g_{s_3}(t)\exp\{-j2\pi\Delta f_{c3}t\} \quad (8)$$

where $$g_{s_1}(t) = a_1(t) + jb_1(t); g_{s_2}(t) = a_2(t) + jb_2(t); g_{s_3}(t) = a_3(t) + jb_3(t) \quad (9)$$

In (9), $a_i(t)$ and $b_i(t)$ may denote the real and imaginary parts of the complex envelope $g_{si}(t)$ for i=1, 2, 3. When the received signal is an OQPSK modulated signal, the various signals $a_i(t)$ and $b_i(t)$ may be obtained by square root raised cosine filtering of the corresponding binary data streams (e.g., as described above with respect to FIG. 3). Accordingly:

$$a_1(t) + jb_1(t) = A_1[I_{1f}(t) + jQ_{1f}(t)] \quad (10)$$

In embodiments utilizing modulation techniques other than OQPSK, similar relationships may be found. In Equation (10), A1 denotes the amplitude; $I_{1f}(t)$ denotes the square-root raised cosine filtered version of the binary in-phase data stream $I_1(t)$. According to various embodiments, $I_{1f}(t)$ may take values of +1 or −1; have a bit rate of $R_{s1}$ bps. Further, $I_{1f}$ may have a raised cosine filter roll-off factor equal to $\alpha_1$. Similarly, $Q_{1f}(t)$ may denote the square root raised cosine filtered version of the binary quadrature data stream $Q_1(t)$. $Q_{1f}(t)$ may also take values of +1 or −1 with a bit rate of $R_{s1}$ bps. The signal $Q_{1f}(t)$ may additionally be delayed by $T_{s1}/2$. In like manner, the complex envelopes of the NB2 and NB3 signals may be given by Equation (11) below:

$$a_2(t) + jb_2(t) = A_2[I_{2f}(t) + jQ_{2f}(t)]; a_3(t) + jb_3(t) = A_3[I_{3f}(t) + jQ_{3f}(t)] \quad (11)$$

The narrowband signal equivalents given by (11) may have symbol rates of $R_{s2}$, $R_{s3}$, respectively, and raised-cosine roll-off factors of $\alpha_2$ and $\alpha_3$, respectively.

Referring back to FIG. 4, the received RF signal r(t) may be down converted to an intermediate frequency $f_{IF}$ by a mixer 406 connected to an RF local oscillator 409 with a frequency $f_{LO}$ defined according to Equation (12) below:

$$f_{IF} = f_c - f_{LO} \quad (12)$$

The output of the mixer 406 may be filtered by intermediate frequency baseband filter 408. The filter 408 may be a band pass filter with a center frequency of $f_{IF}$ and a bandwidth equal to the bandwidth of the composite signal $v_{RF}(t)$. The output of the filter 408 may be an intermediate frequency signal, which may be converted to real and imaginary parts of the complex baseband equivalent by the complex mixer 410. The mixer 410 may split the complex baseband signal, down convert a first portion to baseband at mixer 412, and down convert the section portion to baseband, at mixer 414. A local oscillator 415 may provide the baseband demodulating reference signal to mixer 412. The reference signal offset by $\pi/2$ radians by the $\pi/2$ phase shift block 417 may be applied to mixer 414. The resulting baseband signals a(t) and b(t) may be low-pass filtered at filters 416a, 416b. It will be appreciated that the complex mixer 410 output may also have a noise component. This component, however, is not shown in FIG. 4 for purposes of clarity. The baseband signal outputs of the complex mixer 410 may be converted from analog to digital at analog-to-digital converters (ADC's) 418a, 418b. The sampling rate $F_s$ for the ADC's 418a, 418b may be selected to be greater than or equal to the bandwidth of $B_t$ of the band pass signal $v_{RF}(t)$. $T_s$ may denote the sampling interval, which is equal to $1/F_s$. After being converted to digital, the baseband signals a(k) and b(k) may be combined by the real-to-complex converter 420 to form the complex baseband signal given by (13) below:

$$[a(k) + jb(k)] \quad (13)$$

Next, the complex baseband signal is filtered to isolate the components due to the NB2 and NB3 signals. Before showing the specific implementation shown in FIG. 4, a general discussion is provided. To isolate the component of the complex baseband signal NB2, for example, a complex bandpass filter, having a frequency response $H_{BC2}(f)$, given by (14), may be applied to the complex baseband signal.

$$H_{BC2}(f) = \begin{cases} 1; & -B_{T2}/2 \le f - \Delta f_{c2} < B_{T2}/2 \\ 0; & \text{otherwise} \end{cases} \quad (14)$$

In (14), $B_{T2}$ may be the bandwidth of the band pass signal $v_{RF2}$. The frequency response of the complex filter described by (14) may be expressed in terms of the symmetric frequency response of a real band pass filter given by (15):

$$H_{BP2}(f) = \begin{cases} 1; & -B_{T2}/2 \le ||f| - \Delta f_{c2}| < B_{T2}/2 \\ 0; & \text{otherwise} \end{cases} \quad (15)$$

The Hilbert transform of $H_{BP2}(f)$, given by $\hat{H}_{BP2}(f)$, is expressed by (16):

$$\hat{H}_{BP2}(f) = -j\,\mathrm{sgn}(f)H_{BP2}(f) \quad (16)$$

In (16), sgn(f) denotes the signum function defined by (17):

$$\mathrm{sgn}(f) = \begin{cases} 1; & f \ge 0 \\ -1; & f < 0 \end{cases} \quad (17)$$

From (14)-(17), it follows that:

$$H_{BC2}(f) = 0.5[H_{BP2}(f) + j\hat{H}_{BP2}(f)] \quad (18)$$

The Fourier transform of the real band pass signal $v_{2r}(k)$ obtained by shifting the real RF signal $v_{RF2}(t)$, along with its in band interference introduced by the WB signal, to a center frequency $\Delta f_{c2}$ and converting the resulting signal into digital form may be expressed in terms of the filter transfer function $H_{BP2}(f)$ and its Hilbert transform $\hat{H}_{BP2}(f)$ by (19):

$$V_{2r}(f) = 0.5A(f)H_{BP2}(f) - 0.5B(f)\hat{H}_{BP2}(f) \quad (19)$$

In (19), A(f) and B(f) denote the Fourier transform of a(k) and b(k) respectively.

Similarly the Fourier transform of the real band pass signal $v_{3r}(k)$ obtained by shifting the RF signal $v_{RF3}(t)$ to a center frequency $\Delta f_{c3}$ and converting the resulting signal in to digital form is obtained as shown by (20):

$$V_{3r}(f) = 0.5 A(f) H_{BP3}(f) + 0.5 B(f) \hat{H}_{BP3}(f) \quad (20)$$

In (20), the real band pass filter frequency response $H_{BP3}(f)$ of bandwidth equal to the bandwidth of the second NB signal $v_{RF3}(t)$, is given by (21)

$$H_{BP3}(f) = \begin{cases} 1; & -B_{T3}/2 \leq ||f| - \Delta f_{c3}| < B_{T3}/2 \\ 0; & \text{otherwise} \end{cases} \quad (21)$$

The configuration of FIG. 4 illustrates a specific case where $\Delta f_{c2} = \Delta f_{c3}$ and $B_{T3} = B_{T2}$. In this case, the two filters HBP2(*f*) and HBP3(*f*) a identical and, in view of Equations (20) and (21) may be recovered by a single pair of filters, $H_{NB}(f)$ [422] and $\hat{H}_{NB}(f)$ [424], as shown in FIG. 4. The frequency response of $H_{NB}(f)$ may be given by Equation (22) below:

$$H_{NB}(f) = 0.5\ H_{BP2}(f) \quad (22)$$

$\hat{H}_{NB}(f)$ may be the corresponding Hilbert transform filter of $H_{NB}(f)$. The filters 422, 424 may take as input the baseband signals a[k], b[k], as shown. The outputs of the respective filters 422, 424 may be combined, as illustrated, at summing junctions 426a and 426b to generate a pair of digital signals $v_{2r}(k)$ and $v_{3r}(k)$. Both signals $v_{2r}(k)$ and $v_{3r}(k)$ may be input to respective carrier phase tracking loops 428a, 428b to provide the complex valued carrier reference signals exp $[j\Delta\omega_{c2}T_s(k-k_c)]$ and exp $[j\Delta\omega_{c3}T_s(k-k_c)]$, where the phase at the input to the pair of bandpass filters $H_{NB}(f)$ [422] and $\hat{H}_{NB}(f)$ [424] is the reference phase and $(\Delta\omega_{c2}T_s k_c)$ and $(\Delta\omega_{c3}T_s k_c)$ are the respective phase delays from the reference point to the carrier phase tracking loop outputs corresponding to a processing delay of $k_c T_s$. The complex valued carrier reference signal exp $[j\Delta\omega_{c2}T_s(k-k_c)]$ may be input to a complex conjugate operator block 430. The output of the block 430 may be multiplied by the complex constant exp $[-\Delta\omega_{c2}T_s k_c]$ at multiplier 432a to remove the impact of the processing delay $k_c T_s$ from the reference signal exp $[j\Delta\omega_{c2}T_s(k-k_c)]$ and generate the reference local oscillator signal $v_{L2}(k) = \exp[-j\Delta\omega_{c2}T_s k]$. Similarly, the signal exp $[j\Delta\omega_{c3}T_s(k-k_c)]$ may be multiplied by the complex constant exp $[-\Delta\omega_{c2}T_s k_c]$ at multiplier 432b to generate the reference local oscillator signal $v_{L3}(k) = \exp[j\Delta\omega_{c3}T_s k]$.

Figure 5:
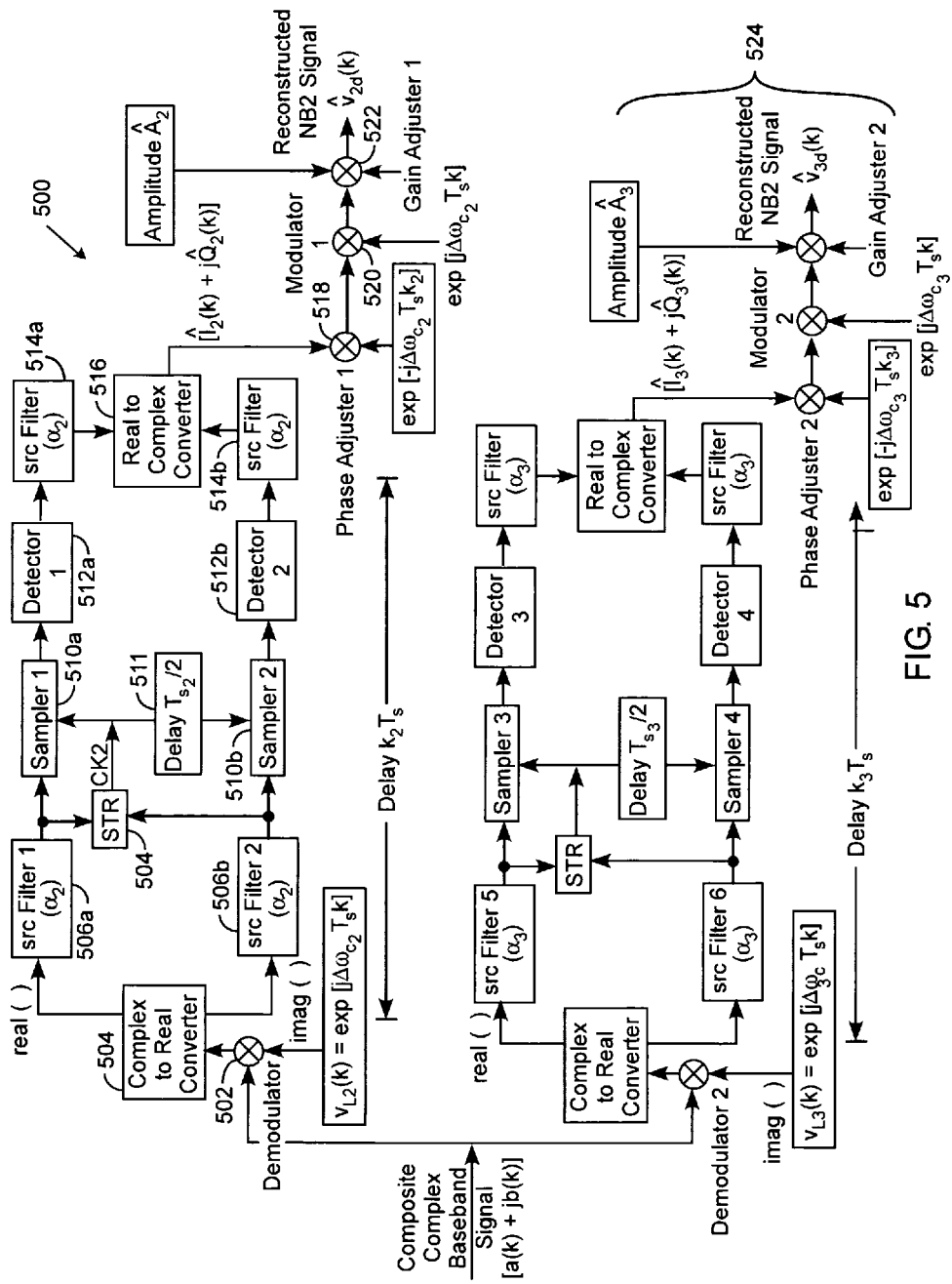
FIG. 5 illustrates a portion of the receiver for estimating complex valued signals from the composite complex baseband signal derived at the output of the real to complex converter of the receiver portion shown in FIG. 4.

FIG. 5 illustrates a module 500 of the receiver for estimating the complex valued signals $v_2(k)$ and $v_3(k)$ from the composite complex baseband signal [a(k)+j b(k)] derived at the output of the real to complex converter 420 of the receiver module 400. A demodulator 502 may receive as input the composite complex baseband signal and the reference signal $v_{2L}(k)$ derived at the output of the multiplier 432a described above. This may shift the center frequency of the second signal $v_2(k)$ from $\Delta f_{c2}$ to 0. The resulting complex valued signal with center frequency zero may be input to the complex to real converter 504, which may output real and imaginary components of the complex valued signal at its output. The real and imaginary components may be filtered by a pair of square root raised cosine filters 506a, 506b with a roll-off factor $\alpha_2$. The outputs of both of the SRC filters 506a, 506b may be input to a symbol time recovery (STR) circuit 508, which may generate a reference clock signal for symbol timing. The output of the SRC filter 506a may be input to the cascade of a sampler 510a, a detector 512a and another SRC filter 514a with a roll-off factor of $\alpha_2$. The result is a delayed in-phase signal of the complex representation of NB2 signal given by $I_2(k-k_2)$, or denoted by $\hat{I}_2(k)$. The sampler 510a may sample the output of the SRC filter 506a at the instance of the maximum eye opening with the sampling instance provided by the reference clock signal from STR 508. The output of the detector 512 may be +1 if the input is greater than or equal to 0 and −1 otherwise. Likewise, the cascade of the sampler 510b, the detector 512b and the SRC filter 514b may provide an estimate of the delayed signal $\hat{Q}_2(k-k_2)$ denoted by $\hat{Q}_2(k)$. The signal $\hat{Q}_2(k)$ may be offset in time from the signal $\hat{I}_2(k)$ by $T_{s1}/2$ due to the effects of the delay circuit 511.

Both of the signals $\hat{I}_2(k)$ and $\hat{Q}_2(k)$ may be input to a real to complex converter 516 to generate the complex valued signal $[\hat{I}_2(k) + j\hat{Q}_2(k)]$. This signal may be multiplied by the complex constant exp $[-\Delta\omega_{c2}T_s k_c]$ at phase adjustor 518 to incorporate phase delay introduced by the processing delay of $k_c T_s$ by the filter 506 samplers 510, detectors 512 and the filters 514. The resulting signal may be modulated by the signal exp $[j\Delta\omega_{c2}T_s k]$ at modulator 520 to shift the spectrum to the center frequency $\Delta\omega_{c2}$. Additionally, the signal may be multiplied by the gain estimate $\hat{A}_2$ at 522, creating a delayed estimate $\hat{v}_{2d}(k)$ of the signal $v_2(k)$, where the delay is equal to $k_2$ samples. The gain estimate $\hat{A}_2$ may be derived from the outputs of the samplers 510a, 510b.

For example, denoting the outputs of the samplers 510a, 510b as by $a_{s2}$ and $b_{s2}$ respectively, the amplitude estimate is obtained by $$\hat{A}_2 = \left[ \sum_{k=1}^{N} \{a_{s_2}^2 + b_{s_2}^2\} \right]^{1/2} \quad (22a)$$

In (22a), N may be the time-averaging window size. According to various embodiments, the estimate of $\hat{A}_2$ may be updated by taking the average of equation (22a) over consecutive intervals of N samples.

The components of portion 524 of the module 500 may operate in a manner similar to that described above to generate a delayed estimate $\hat{v}_{3d}(k)$ of the signal $v_3(k)$. In the portion 524, however, the roll-off factor of the various SRC filters may be equal to $\alpha_3$. Further, the delay associated with the delayed estimate $\hat{v}_{3d}(k)$ may be $k_3$ samples. The delayed estimates $\hat{v}_{2d}(k)$ and $\hat{v}_{3d}(k)$ may be utilized to remove from the wideband signal WB the effects of interference from the narrowband signals NB2, NB3, for example, as described below with respect to the module 600.

Figure 6:
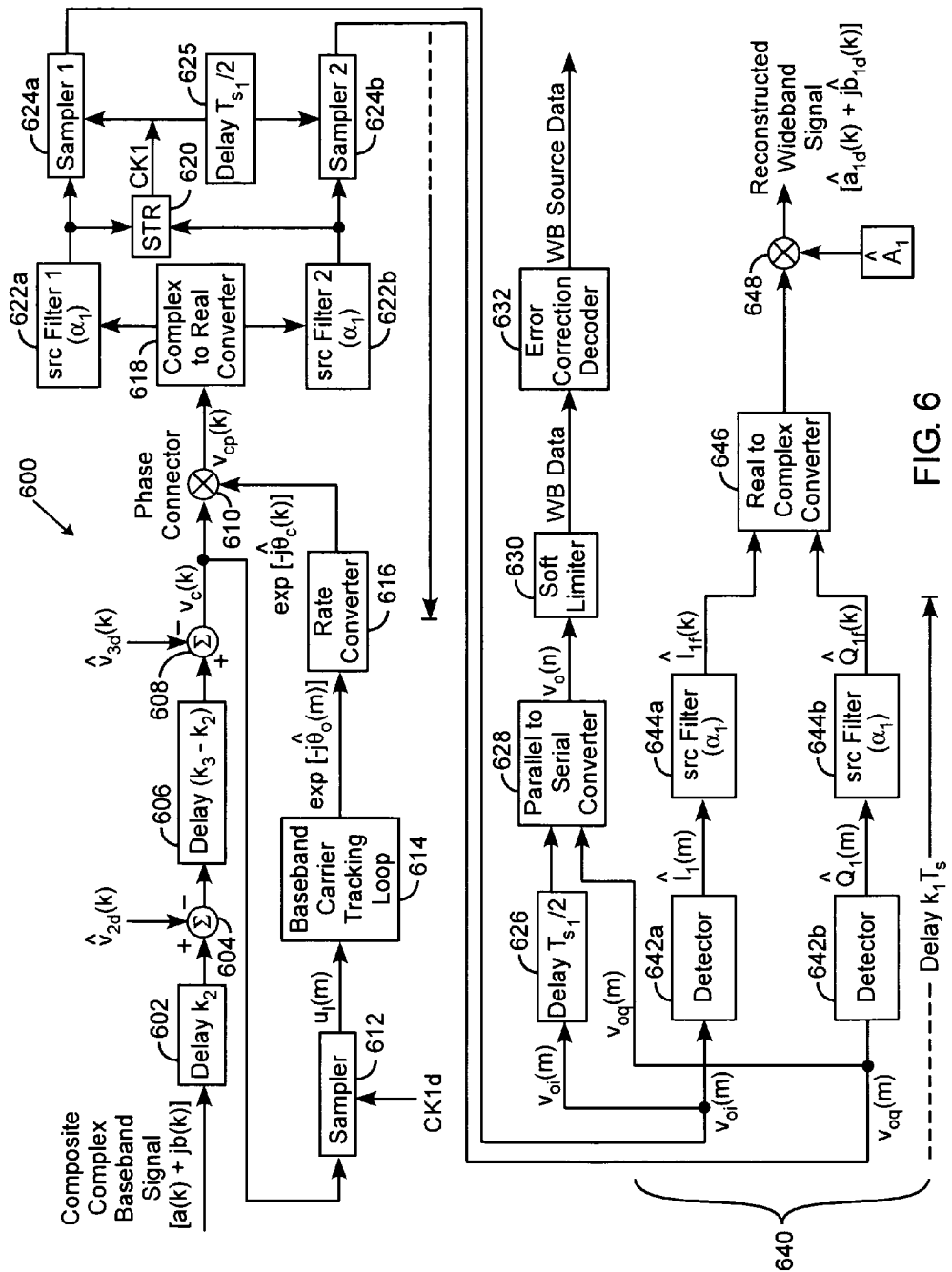
FIG. 6 illustrates one embodiment of a module for mitigating interference to the wideband signal due to the presence of the narrowband signals, estimate the wideband signal present in the complex baseband signal and detect the wideband data.

FIG. 6 illustrates one embodiment of a module 600 for mitigating interference to the WB signal due to the presence of the NB2 and NB3 signals, estimate the WB signal $v_1(k)$ present in the complex baseband signal [a(k)+jb(k)] and detect the WB data. Assuming that the delay $k_3$ is higher than $k_2$, the complex signal [a(k)+j b(k)] may be delayed by $k_2$ at 602. The estimate $\hat{v}_{2d}(k)$ of the narrowband signal NB2 may be subtracted from the delayed version of the complex signal [a(k)+jb(k)] at summing junction 604. The resulting difference signal may be further delayed by $(k_3-k_2)$ at 606. The estimate $\hat{v}_{3d}(k)$ of the narrowband signal NB3 may be subtracted from the resulting delayed signal at 608 to provide the interference compensated wideband signal $v_c(k)$ at the complex baseband. The interference compensated signal $v_c(k)$ is compensated for any carrier phase error by a phase corrector 610. At the phase corrector 610, the interference compensated signal $v_c(k)$ may be multiplied by exp $[-j\hat{\theta}_c(k)]$ where $\hat{\theta}_c(k)$ denotes the carrier phase reference. To obtain the carrier phase reference $\hat{\theta}_c(k)$, the interference compensated signal $v_c(k)$ may be sampled at the symbol rate by sampler 612, which may sample the signal at the symbol rate of $1/T_{s1}$ by the sampling clock $CK_{1d}$. The sampling clock $CK_{1d}$ may be a time-offset version of the clock $CK_1$ generated by the symbol timing recovery (STR) block 620. The time offset between the clocks $CK_1$ and $CK_{1d}$ may be equal to the inverse of the delay introduced by filter 622 modulo $T_{s1}$, (e.g., it may be equal to $T_{s1}$ minus the fractional symbol period part of the filter delay and is equal to zero when the filter delay is equal to an integer multiple of $T_{s1}$ as is normally the case). The output $u_t(m)$ of the sampler 612 may be input to a baseband carrier tracking loop 614 that may provides the carrier reference signal exp $[-j\hat{\theta}_c(m)]$ at the symbol rate. A rate converter block 616 at the output of the baseband carrier tracking loop 614 may convert the sampling rate of the carrier reference signal to $F_s$ and inputs the rate converted carrier reference signal exp $[-j\hat{\theta}_c(k)]$ to the phase corrector 610 for removing any phase error from the signal $v_c(k)$.

The interference compensated and carrier phase corrected complex baseband signal $v_{cp}(k)$ may be split into the real and imaginary parts by a complex to real converter 618. The real and imaginary parts of $v_{cp}(k)$ may be filtered by the respective SRC filters 622a, 622b and sampled by samplers 624a, 624b at the symbol rate with the sampling times provided by STR 620 both directly (for the real part) and delayed by a delay equal to $T_{s1}/2$ at 625 (for the imaginary part). The result may be an in-phase sampled output $v_{oi}(m)$ and a quadrature sampled output $v_{oq}(m)$.

Figure 7:
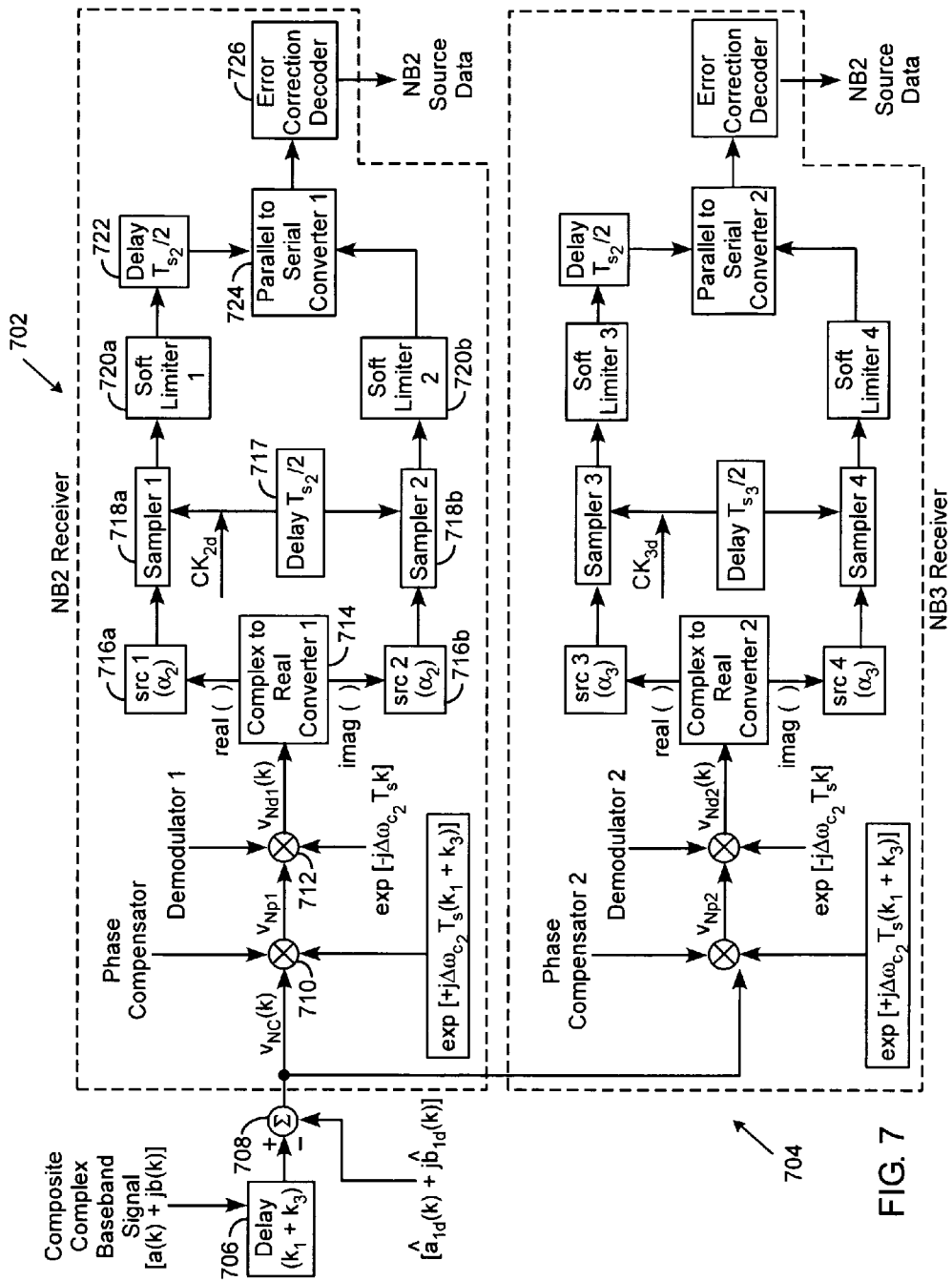
FIG. 7 illustrates one embodiment of a module for generating source data from the narrowband signal and a module for generating source data for the narrowband signal.

The sampled output $v_{oi}(m)$ delayed by $T_{s1}/2$ at 626 and $u_{oq}(m)$, may be input to a parallel to serial converter 628 for multiplexing the inphase and quadrature signals $v_{oi}(m)$ and $v_{oq}(m)$ into a single real signal $v_o(n)$ at a rate $2R_{s1}$, where n denotes the bit time index of the signal $v_o$. The signal $v_o(n)$ is input to a soft limiter 630 for the purpose of quantization wherein the number of quantization levels is dependent upon the error correction decoder block 632 that follows the soft limiter 630. According to various embodiments, the soft limiter 630 may be replaced by a hard limiter. In embodiments where the wideband signal WB represents a data stream independent from the narrowband signals NB2, NB3, then the bare wideband signal WB may be input to the error detection decoder 632 to generate the wideband source data, as shown. In embodiments where the wideband signal WB is obtained by splitting an otherwise single user signal, as illustrated in FIG. 2, the wide band signal WB data at the output of the soft limiter 630 of FIG. 6 may be combined with the narrowband signal or signals NB2 and NB3, which may be derived, for example, as shown in FIG. 7. The result may be input to the detection decoder 632.

The module 600 may also comprise a portion 640 that utilizes the in-phase sampled output $v_{oi}(m)$ and a quadrature sampled output $v_{oq}(m)$ to generate a reconstructed wideband signal $[\hat{a}_{1d}(k)+j\hat{b}_{1d}(k)]$. The reconstructed wideband signal $[\hat{a}_{1d}(k)+j\hat{b}_{1d}(k)]$ may be used to mitigate interference to the narrowband signals NB2, NB3 due to the wideband signal WB. The signal $v_{oi}(m)$ may be processed by detector 642a and SRC filter 644a to provide a filtered version of the real part of the wideband data, denoted by $\hat{I}_{1f}(k)$. Similarly, the signal $v_{oq}(m)$ may be processed by the detector 642b and SRC filter 644b to provide a filtered version of the imaginary component of the wideband data, denoted by $\hat{Q}_{1f}(k)$. The real and imaginary components $\hat{I}_{1f}(k)$ and $\hat{Q}_{1f}(k)$ may be combined at the real to complex converter 646 to provide a filter version of the complex baseband wideband (WB) data $[\hat{I}_{1f}(k)+j\hat{Q}_{1f}(k)]$. This signal may be multiplied by an amplitude estimate $\hat{A}_1$ at 648, resulting in the delayed version of the wideband signal $[\hat{a}_{1d}(k)+j\hat{b}_{1d}(k)]$ for eliminating the interference from the narrowband signals. The amplitude estimate $\hat{A}_1$ may be generated by the baseband carrier tracking loop 614, as illustrated below with reference to FIG. 8, or may generated as described above with respect to (22a).

Figure 6A:
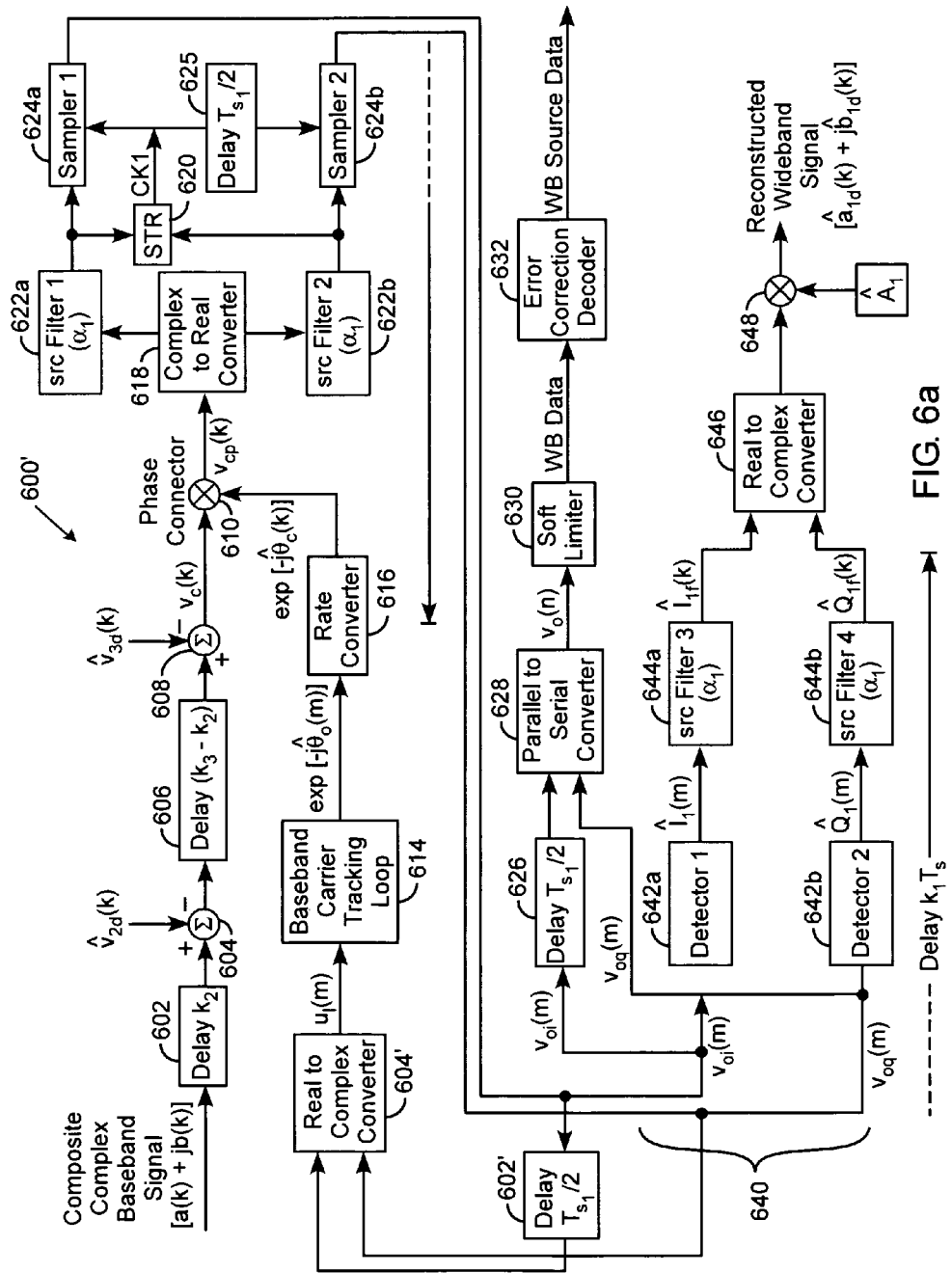
FIG. 6a illustrates an additional embodiment of the module of FIG. 6.

FIG. 6a illustrates an additional embodiment of the module 600'. In the module 600', the carrier phase reference $\hat{\theta}_c(k)$ may be found based on the signals $v_{oi}(m)$, $v_{oq}(m)$, rather than from the output of the sampler 612. For example the signal $v_{oi}(m)$ may be delayed at 602' by $T_{s1}/2$. The delayed signal $v_{oi}(m)$ and the signal $v_{oq}(m)$ may be provided to a real-to-complex converter 604'. The output of the real-to-complex converter 604' may be provided to the baseband carrier tracking loop 614, which may operate substantially as described herein.

FIG. 7 illustrates one embodiment of a module 702 for generating source data from the narrowband signal NB1 and a module 704 for generating source data for the narrowband signal NB2. The modules 702, 704 may remove interference between the respective narrowband signals NB1, NB2 and the wideband signal WB in a manner similar to the that with which the inverse interference was removed from the WB signal with the module 600 shown in FIG. 6. In FIG. 7, the complex baseband signal $[a(k)+b(k)]$ may be delayed at 706 by $(k_1+k_3)$ samples. This may be equal to the delay introduced in the estimation of the signal $[a_1(k)+b_1(k)]$. The delayed, reconstructed WB signal $[\hat{a}_{1d}(k)+j\hat{b}_{1d}(k)]$ is subtracted from the delayed version of the signal $[a(k)+b(k)]$ at 708. The result may be an interference compensated narrowband signal $v_{Nc}(k)$. The interference compensated signal $v_{Nc}(k)$ is input to both of the modules 702, 704. In module 702, corresponding to the narrowband signal NB2, the signal $v_{Nc}(k)$ is compensated for the phase delay introduced due to the $(k_1+k_3)$ samples processing delay, by the phase compensator 710. The result may be a compensated signal $v_{Np1}$ that is input to the demodulator 712, generating the demodulated narrowband signal with center frequency of 0 Hz, denoted by $v_{Nd1}$. The signal $v_{Nd1}$ may be split in to the real and imaginary components by the complex to real converter 714. The real part of the signal $v_{Nd1}$ may be filtered by SRC filter 716a, which may have a roll off factor of $\alpha_2$. The real part of the signal $v_{Nd1}$ may also be sampled at the rate $T_{s2}$ by sampler 718a, with the resulting signal input to a soft limiter 720a. A clock signal $CK2d$ of the sampler 718a may be derived by delaying the clock signal $CK2$ of the module 500 by $(k_1+k_3)T_s$ seconds.

In embodiments where the signals are modulated according to OQPSK modulation, the soft limiter 720a output may be delayed by $T_{s1}/2$ at 722. The delayed version from 722 may be input to the parallel to serial converter 724. Similarly the imaginary part of the signal $v_{Nd1}$ may be filtered by SRC filter 716b, with a roll off factor $\alpha_2$, sampled at the rate $T_{s2}$ by sampler 718b. Again, the resulting signal may be input to soft limiter 720b. The output of the soft limiter 720b may be the second input to the parallel to serial converter 724. The serial output of the parallel to serial converter 724 may represent the soft limited version of the binary bit stream of the NB2 signal and may be input to the error correction decoder 726 for providing the recovered NB2 source data. It will be appreciated that the module 704 for recovering the narrowband signal NB3 may operate in a manner substantially similar to that of the module 702, as illustrated in FIG. 7, with suitable differences. For example, the SRC filters of the module 704 may operate with a roll-off factor of $\alpha_3$.

Figure 8:
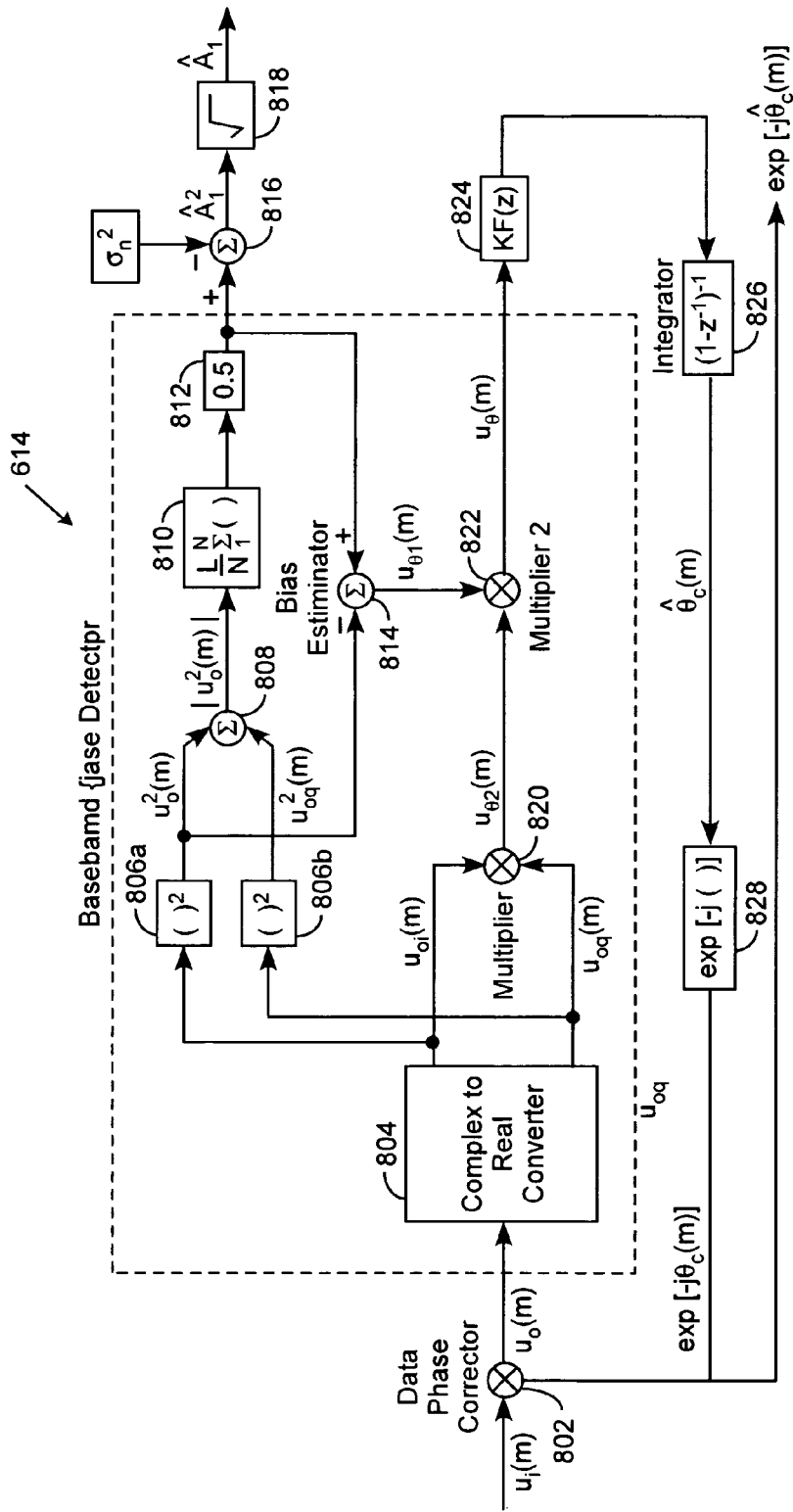
FIG. 8 illustrates one embodiment of the baseband carrier tracking loop of the module shown in FIG. 6.

FIG. 8 illustrates one embodiment of the baseband carrier tracking loop 614 of the module 600 shown in FIG. 6. The loop 614 may obtain the wideband signal WB carrier phase difference signal exp $[-j\hat{\theta}_c(m)]$, utilized at the phase corrector 610 above, and the amplitude estimate $\hat{A}_1$, utilized at 648 above. As shown in FIG. 6, the loop 614 may receive as input the complex valued signal $u_i(m)$ generated by the sampler 612. This signal may be applied to a data phase corrector 802, which may multiply the signal $u_i(m)$ by a feedback carrier phase reference signal exp $[-j\hat{\theta}_c(m)]$ to reduce or eliminate any phase error. The resulting phase corrected signal $u_o(m)$ may be split into real and imaginary parts $u_{oi}(m)$ and $u_{oq}(m)$ at complex to real converter 804. The signals $u_{oi}(m)$ and $u_{oq}(m)$ may be squared at 806a and 806b, respectively, and added together at summing junction 808 to provide the norm square of the signal $u_o(m)$ given by $|u_o(m)|^2 = u_{oi}^2(m) + u_{oq}^2(m)$. The norm square of the signal $u_o(m)$ may be averaged at a signal averaging block 810. The result may be an average over an appropriate number of N samples. This may be multiplied by 0.5 at 812 and input to a bias estimator 814. The bias estimator 814 may subtract $u_{oi}^2(m)$ from 0.5 times the average value, providing an unbiased estimate of one of the component signals required to generate the phase error signal. The difference between the 0.5 times the average value and the noise variance $\sigma_n^2$, found at 816, may provide an estimate of the square of the wideband signal WB amplitude $A_1$. Taking the square root of this value at 818 may result in the wideband signal WB amplitude estimate $\hat{A}_1$.

The values $u_{oi}(m)$ and $u_{oq}(m)$ may be multiplied at multiplier 820 to provide the second of the component signals required for generating the phase error signal. The two component signals may be multiplied at multiplier 822 to generate the phase error signal $u_e(m)$. The phase error signal $u_e(m)$ may be filtered at filter 824, integrated at integrator 826 and further operated on by $\exp()$ block 828 to generate the phase difference signal $\exp[-j\hat{\theta}_c(m)]$ utilized by the module 600 as described above.

The operating of the loop 614 may be further explained mathematically as follows. Referring to FIG. 6, the complex signal $u_i(m)$, obtained after eliminating the interference from the narrowband signals and appearing at the output of the sampler 612, may be given by (23):

$$u_i(m) = A_1[I_1(m) + jQ_1(m)] \exp[j\theta_c(m)] + \bar{n}_i(m) + j\bar{n}_q(m) \quad (23)$$

In (23), $\theta_c(m)$ denotes the carrier phase at symbol time m; $\bar{n}_i(m)$ and $\bar{n}_q(m)$ are the in phase and quadrature noise samples each with variance $\sigma_n^2$; and $I_1(m)$ and $Q_1(m)$ are the in phase and quadrature binary data streams of the wideband signal WB taking values $\pm 1$. Referring again to FIG. 8, the output $u_o(m)$ of the data phase corrector 802 may then given by (24):

$$u_o(m) = u_i(m) \exp[-j\hat{\theta}_c(m)] \quad (24)$$

With the substitution for $u_i(m)$ from (23), (24) may be written as shown in (25):

$$u_o(m) = A_1[I_1(m) + jQ_1(m)] \exp[j\theta_e(m)] + [n_i(m) + jn_q(m)] \quad (25)$$

In (25), $\theta_e(m) = \theta_c(m) - \hat{\theta}_c(m)$ may be the phase estimation error and $[n_i(m) + jn_q(m)]$ may represent the phase rotated version of the noise $[\bar{n}_i(m) + j\bar{n}_q(m)]$. Thus each of $n_i(m)$ and $n_q(m)$ terms may also have a variance equal to $\sigma_n^2$. From (25) the real and imaginary parts of $u_o(m)$ may be expressed as $$u_{oi}(m) = A_1[I_1(m)\cos[\theta_e(m)] - Q_1(m)\sin[\theta_e(m)]] + n_i(m) \quad (26)$$

$$u_{oq}(m) = A_1[I_1(m)\sin[\theta_e(m)] + Q_1(m)\cos[\theta_e(m)]] + n_q(m) \quad (27)$$

Squaring both sides of (26) and (27) and dropping the index m for convenience, yields:

$$u_{oi}^2 = A_1^2[1 - I_1 Q_1 \sin(2\theta_e)] + n_i^2 + \xi_i; \quad (28)$$

$$u_{oq}^2 = A_1^2[1 + I_1 Q_1 \sin(2\theta_e)] + n_q^2 + \xi_q \quad (29)$$

In (28)-(29) and are zero mean noise processes. From (28)-(29):

$$0.5[u_{oi}^2 + u_{oq}^2] = +A_1^2 + 0.5(n_i^2 + n_i^2) + 0.5(\xi_i + \xi_q) \quad (30)$$

Taking expected value on both sides of (30) yields:

$$0.5 E[u_{oi}^2 + u_{oq}^2] = A_1^2 + \sigma_n^2 \quad (31)$$

In (31), E denotes the expected value operator which in practice is estimated by a time average over a period N, as is the case in the embodiment shown in FIG. 8, and comprises one of the outputs of the baseband phase detector in FIG. 8. Thus the estimate of $A_1^2$ is given by (31):

$$\hat{A}_1^2 = 0.5 \frac{1}{N} \sum_{m=1}^{N} [u_{oi}^2(m) + u_{oq}^2(m)] - \sigma_n^2 \quad (32)$$

Subtracting the left hand side of (28) from that of (31) as is implemented by the bias eliminator 814 in FIG. 8 yields (33):

$$u_{e_1} \equiv 0.5 E[u_{oi}^2 + u_{oq}^2] - u_{oi}^2 = A_1^2 I_1 Q_1 \sin(2\theta_e) + \zeta_1; \zeta_1 = \zeta_1(\sigma_n^2 - n_i^2 - \xi_i) \quad (33)$$

In (33), $u_{e_1}$ is the first of the component signals required to generate the phase error signal appearing at the output of the bias eliminator 614, where the expected value operation is estimated by a time average over N samples. In (33) $\zeta_1$ may be a zero mean noise. Multiplying both sides of (26) and (27) results in the following expression for the second component signal $u_{e_2}$ required to generate the phase error signal:

$$u_{e_2} \equiv u_{oi} u_{oq} = A_1^2 I_1 Q_1 \cos(2\theta_e) + \zeta_2 \quad (34)$$

In (34), $\zeta_2$ represents a zero mean noise process. Multiplication of both sides of (33) by the respective sides of (34) results in the following phase error signal $u_e$ that appears at the output of the multiplier 822 in FIG. 8:

$$u_e = u_{e_1} \cdot u_{e_2} = 0.5 A_1^4 \sin(4\theta_e) + \zeta \quad (35)$$

In (35), $\zeta$ is some zero mean noise process. In the tracking mode $\theta_e$ is relatively small in magnitude and, therefore, $\sin(4\theta_e) \approx 4\theta_e$, and thus the phase error signal $u_e$ is proportional to the phase error $\theta_e$. In FIG. 8 the phase error signal $u_e$ may be input to a loop filter 824 with gain K and transfer function F(z). The output of the filter 824 may be input to the cascade of an integrator 826 and the $\exp()$ block 828 that models the VCO in the band pass carrier tracking loop. The result may be the carrier reference phase signal $\exp[-j\hat{\theta}_c(m)]$, which is input to the data phase detector 610 for correcting the phase of the input signal $u_i(m)$.

When the wideband and narrowband data streams are obtained by splitting a single input data stream, the symbol rates $R_{s2}$, $R_{s3}$ for the narrowband signals NB2, NB3 and the frequency offsets $\Delta f_{c2}$ and $\Delta f_{c3}$ may be selected such that they are integrally related to the symbol rate $R_{s1}$ of the wideband data. Accordingly, the symbol timing signals for the narrowband signals and the subcarrier frequency $\Delta f_{c2}$ and $\Delta f_{c3}$ signals may be derived from the common symbol timing signal for the wideband signal WB at the receiver and thus do not require independent tracking loops. Conversely, in embodiments where the symbol rates $R_{s2}$, $R_{s3}$ for the narrowband signals NB2, NB3 and the frequency offsets $\Delta f_{c2}$ and $\Delta f_{c3}$ are not integrally related to the symbol rate $R_{s1}$ of the wideband data, separate independent tracking loops may be required for one or both of the narrowband signals NB2, NB3.

According to various embodiments, iterative techniques may be utilized to further increase the performance of the receiver. For example, the process of removing interference from the WB signal (modules 600 and 600') and of removing interference from the NB2 and NB3 signals (modules 702 and 704) may be executed more than once. For example, when desired, the WB signal obtained by the module 600 and/or 600' may be reprocessed a second time with the regenerated interference free NB signals obtained from modulates 702 and 704.

According to other various embodiments, the error correction decoder 632 of the modules 600 and 600' in FIGS. 6 and 6a may be made a part of an iterative process wherein the detected data (e.g. the WB source data) is input to the error correction code decoder 632. The error corrected source data at the output of the error correction code decoder may then be encoded by an error correction encoder (not shown) to generate modified detected data. The modified detected data may then be used instead of the detected data before error correction code decoding to regenerate the various signals for eliminating the mutual interference among the wideband and narrowband signals while accounting for the delay introduced by the decoder and encoder pair. For example, detectors 642a, 642b may be replaced by soft limiters, the outputs of which may be multiplexed by a parallel to serial converter (not shown). The multiplexed output may be processed by the cascade of the error correction code decoder and encoder, the output of the cascade is then input to a serial to parallel converter. The two outputs of the serial to parallel converter may be input to the src filters 644a, 644b.

Figure 9:
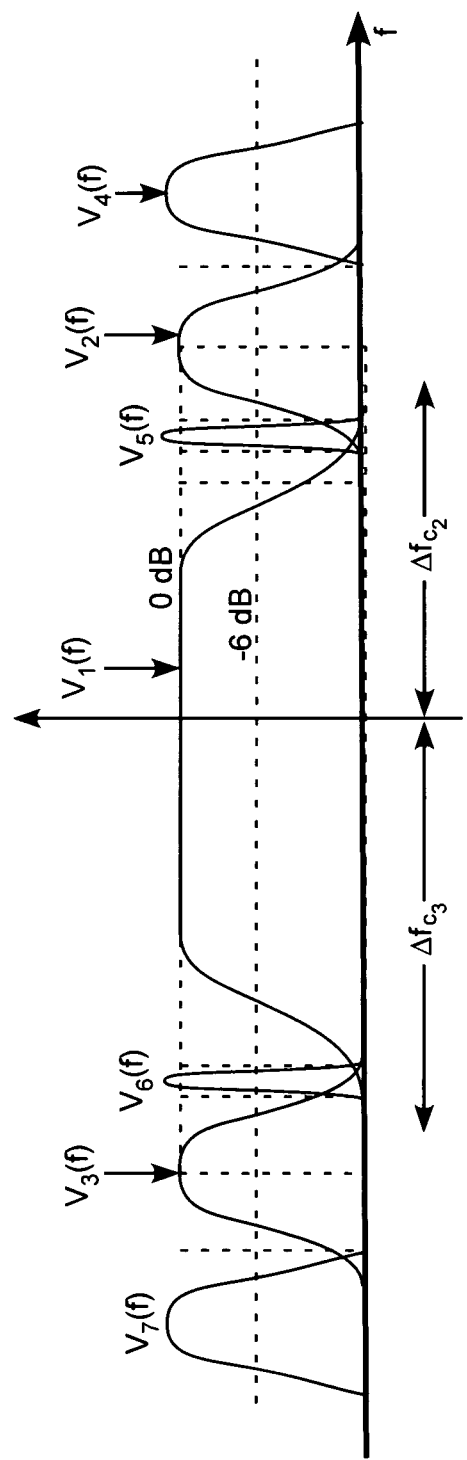
FIG. 9 illustrates one embodiment of a configuration comprising seven signals with spectrum overlap.

According to various embodiments, the techniques described herein may be utilized to combine more than three signals, further increasing capacity. For example, FIG. 9 illustrates one embodiment of a configuration comprising seven signals with spectrum overlap. In FIG. 9, the signal spectrum $V_1(f)$ may correspond to the bandwidth of the wideband signal WB described above, while signal spectrums $V_2(f)$, $V_3(f)$ may correspond to the bandwidth of the narrowband signals NB2 and NB3 described above. As illustrated in FIG. 9, however, an additional signal $v_4(t)$ is added such that the left edge of its spectrum $V_4(f)$ coincides with the 6 dB cut-off frequency of $V_2(f)$. A signal $v_5(t)$ is added with its spectrum $V_5(f)$ limited to within the 6 dB cut-off frequencies of $V_1(f)$ and $V_2(f)$. Two additional signals $v_6(t)$ and $v_7(t)$ are also shown with their spectrum lying to the left of the center frequency of $V_1(f)$. The signals $v_2(t)$, $v_4(t)$ and $v_5(t)$ may be obtained by splitting the data stream of a single narrowband signal. These signals may be processed iteratively by a receiver. For example, the receiver may first detect the signals $v_4(t)$ and $v_5(t)$ and then mitigate their interference from $v_2(t)$, detect $v_2(t)$ and finally use the reconstructed signal to mitigate the interference from signals $v_4(t)$ and $v_5(t)$. Similarly, the signals $v_3(t)$ and $v_6(t)$, $v_7(t)$ are detected. The interference from all of the narrowband signals may then be removed from the wideband signal $v_1(t)$.

In the case where all of the signals are confined to the bandwidth of the wideband signal and the narrowband signals have their spectrums confined to within −6 dB cut-off frequencies of the neighboring signals, then the total achievable symbol rate $R_s$ may be computed as:

$$R_s = R_{s1}\left[1 + \frac{\alpha_1}{(1+\alpha_2)} + \frac{\alpha_1 \alpha_2}{(1+\alpha_2)(1+\alpha_4)}\right] \quad (36)$$

According to various embodiments, it may be assumed that $\alpha_2=\alpha_3$; and $\alpha_4=\alpha_5=\alpha_6=\alpha_7$. As an example, with $\alpha_1=0.3$ and $\alpha_2=\alpha_4=0.2$, from (36), $R_s=1.292 R_{s1}$ showing about 30% increase in the total symbol rate within the bandwidth occupied by the WB signal. It may be possible to increase the capacity further by increasing the overlap among the signals beyond that considered in the example.

Although the embodiments described herein comprise a single wideband signal and multiple narrowband signal, the principles set forth may apply equally to embodiments having more than one wideband signal. For example, two or more signals may be wideband having the same or nearly equal bandwidths. The wideband signals may be spectrally positioned such that there is significant overlap between their spectrums. Narrowband signals may, but need not always, be placed in the skirts of one or more of the wideband signals. Mutual interference among these signals may be mitigated by the recursive detection, interference estimation and mitigation procedures described herein.

According to various embodiments, the techniques described herein may be utilized to combine and decouple signals with modulations other than OQPSK including, for example, Multiple Phase Shift Keying (MPSK), such as Eight Phase Shift Keying (8PSK) and Multiple Quadrature Amplitude Modulation (MQAM) with a number of symbols M in the symbol alphabet greater than four. Furthermore, it may not be necessary to modulate all of the combined signals according to the same modulation. For example, the wideband signal may be OQPSK modulated with the narrowband signals having 8PSK modulation.

According to various embodiments, the baseband filter of the baseband signals may be different than the square root raised cosine filter and the skirt may be defined differently than with reference to the frequency at which the power spectral density is 6 dB lower than the peak power spectral density of the signal and thus the signal spectrums overlap may extend beyond the 6 dB bandwidth.

As a validation of the systems and methods described herein, a simulation program was developed utilizing the MATLAB software package available from THE MATHWORKS. The results are presented for the case of a wideband signal WB and a single narrowband signal NB with spectrum overlap. To keep the focus on the interference rejection, it is assumed in the simulations that the various carrier phase tracking and symbol timing recovery loops provide error free reference signals. This may be typical in simulations of traditional systems including that of the first test case described herein below. In the simulations presented herein, it is assumed that the wideband and narrowband signals arise from different physical locations. Thus while the wideband signal WB receiver processes the narrowband signal NB to mitigate the interference due to the NB signal and the NB signal receiver simply ignores the presence of the WB signal.

Figure 10:
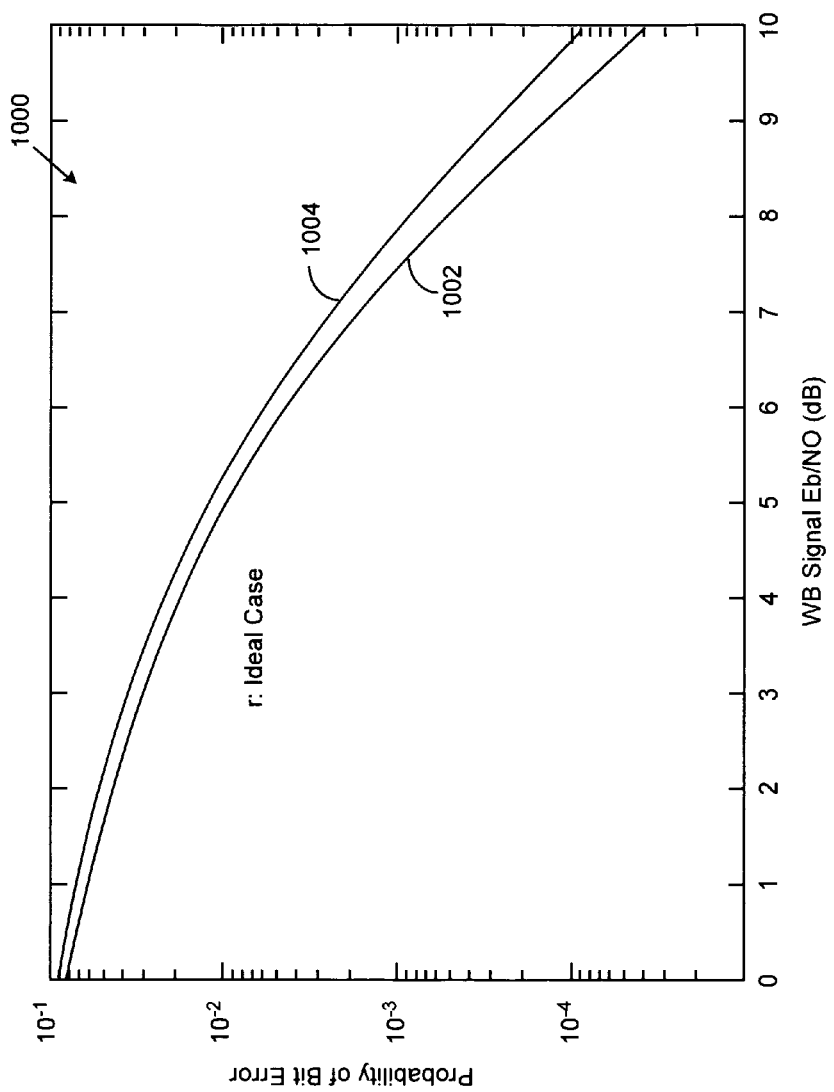
FIGS. 10 and 11 illustrate plots of simulation results for a first test case where the wideband signal and the narrowband signals do not overlap.
Figure 11:
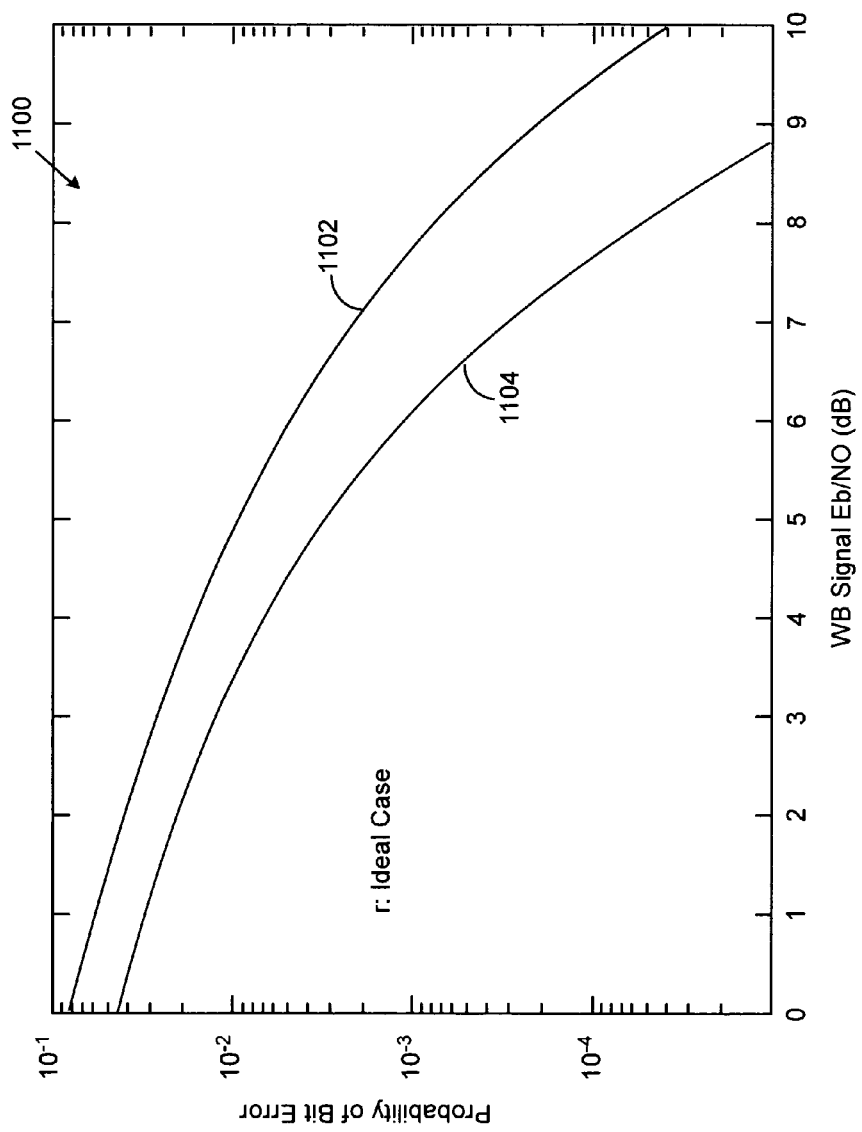

FIGS. 10 and 11 illustrate plots of simulation results for a first test case where the spectrums of a wideband signal and a narrowband signal do not overlap. The first test case, without spectrum overlap, was selected to validate the simulation program. Because the selected wideband and narrowband signals did not overlap, the results for the first test case were expected to be the same as for the ideal case of two non-overlapping FDMA signals. The wideband signal had a rate $R_{s1}=100$ Msps and was modulated and demodulated with a square-root raised cosine filter roll-off factor $\alpha_1$ equal to 0.3. The narrowband signal NB had a symbol rate $R_{s2}=5$ Msps and a filter roll-off factor $\alpha_2=0.21$. Also, the narrow band signal (before being modulated by the carrier frequency $\Delta f_c$ had a peak power spectral density (PSD at the center frequency) that is $\Delta \mathcal{P}_0=2$ dB higher compared to the corresponding peak PSD of the WB signal. To ensure that the wideband and narrowband signal spectrums do not overlap, the difference $\Delta f_c$ between the respective carrier frequencies of the two signals was chosen to be 70.3 MHz, which is greater than the sum of the bandwidths of the two signals. The one-sided null bandwidth of the wideband signal wideband was $W_1=(1+\alpha_1) R_{s1}/2=65$ MHz. The one-sided null bandwidth $W_2$ of the narrowband signal was $W_2=(1+\alpha_2) R_{s2}/2=3.025$ MHz. Accordingly, the sum of the bandwidths of the two signals (e.g., $W_1+W_2=65+3.025=68.025$ MHz) is less than the selected difference M in carrier frequencies (e.g., 70.3 MHz).

FIG. 10 illustrates a chart 1000 of the probability of bit error for the wideband signal, denoted by $P_{ew}$, versus the bit energy to noise spectral density $(E_b/N_0)_T$ for the first test case described above. The bit energy to noise spectral density ratio $(E_b/N_0)_T$ may be computed on the assumption that all of the transmit power is allocated to the wideband signal only (e.g., the bit energy $E_b=PT_{b1}$ where P is the transmit power and $T_{b1}$ is the bit period for the WB signal). A first curve 1004 corresponds to the wideband signal from the first test case. A second curve 1002 illustrates results for an ideal case where only the wideband signal is present. The difference between the two curves accounts for the power sharing loss $P_{L1}$ given by (37):

$$P_{L1} \text{ (dB)}=10 \log \{[R_{s1}+10^{\Delta \mathcal{P}_0/10} R_{s2}]/[R_{s1}+R_{s2}]\}=0.33 \text{ dB} \quad (37)$$

The actual $(E_b/N_0)$ of the wideband signal denoted by $(E_b/N_0)_{WB}$ may be given by (38):

$$(E_b/N_0)_{WB}=(E_b/N_0)_T-P_{L1} \quad (38)$$

The difference between the two graphs in FIG. 10 is equal to 0.33 dB which is precisely equal to $P_{L1}$ as explained above and thus validating the simulations.

FIG. 11 illustrates a chart 1100 showing the probability of bit error versus the bit energy to noise spectral density ratio $(E_b/N_0)_T$ for the narrowband signal from the first test case described above. The narrowband signal may be denoted by $P_{eN}$. The actual $(E_b/N_0)$ of the narrowband signal denoted by $(E_b/N_0)_{NB}$ is given by (39):

$$(E_b/N_0)_{NB}=(E_b/N_0)_{WB}+\Delta \mathcal{P}_0=(E_b/N_0)_T-P_{L1}+\Delta \mathcal{P}_0 \quad (39)$$

and therefore:

$$(E_b/N_0)_{NB}=(E_b/N_0)_T-0.33+2=(E_b/N_0)_T+1.67 \text{ dB}. \quad (40)$$

A first curve 1102 corresponds to the narrowband signal from the first case, while a second curve 1104 corresponds to the ideal case. The difference between the two curves 1102, 1104 in FIG. 11 is precisely equal to the difference $(E_b/N_0)_{NB}-(E_b/N_0)_T$ equal to 1.67 dB thus also validating the simulation results for the NB signal as well.

Figure 12:
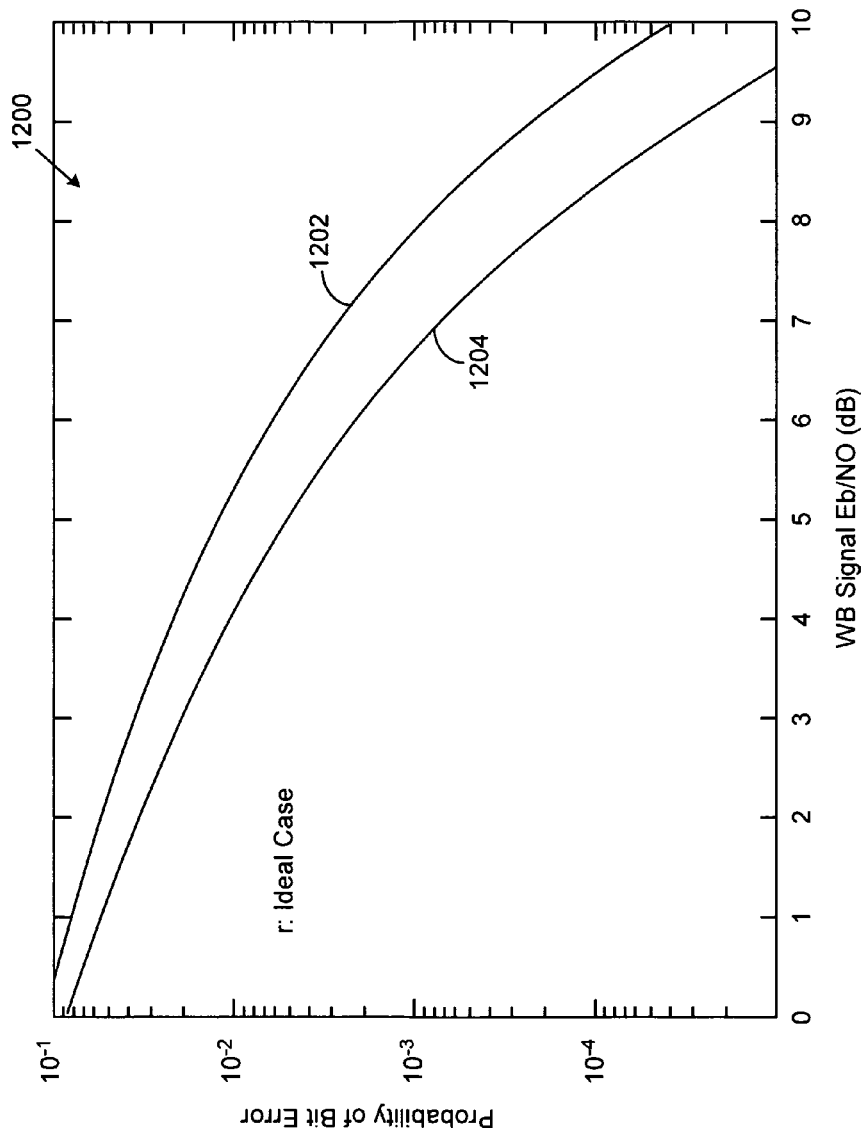
FIGS. 12 and 13 illustrate plots of the performance results for a second test case where the wideband signal and the narrowband signals overlap.
Figure 13:
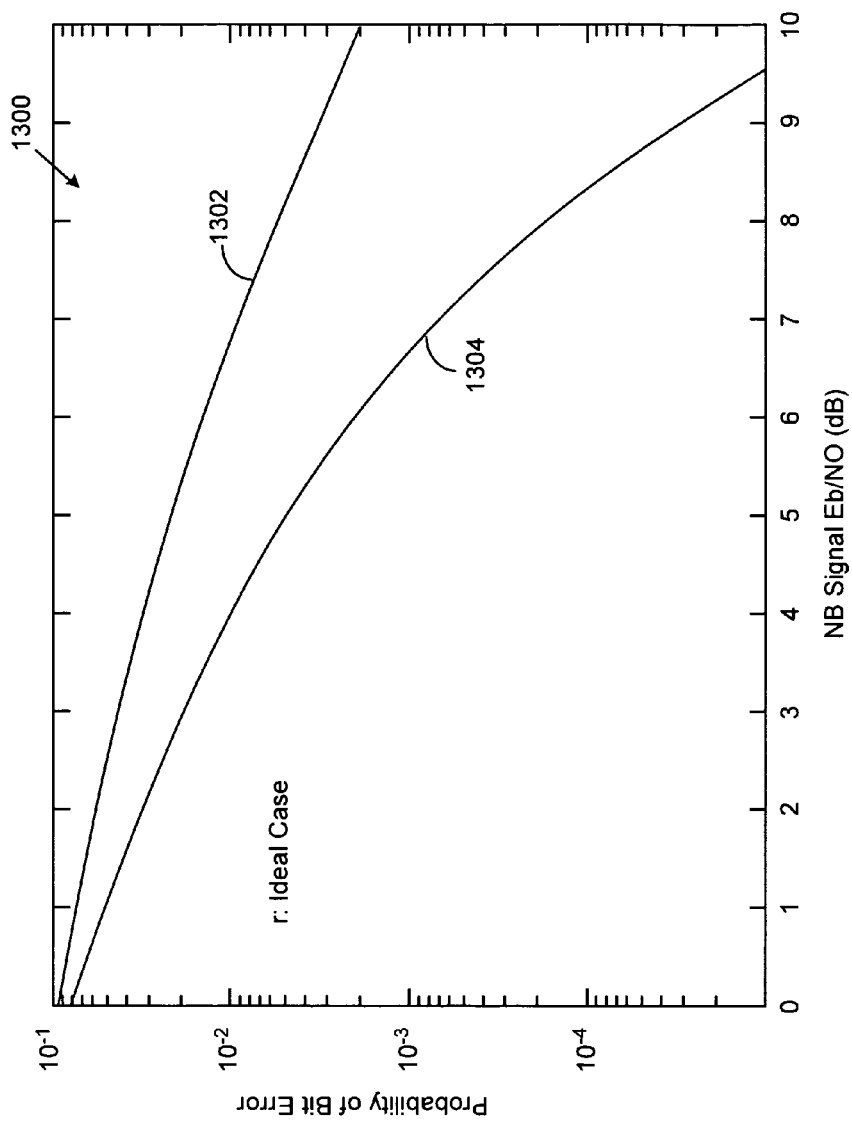

FIGS. 12 and 13 illustrate plots of the performance results for a second test case where the wideband signal and the narrowband signals overlap. In the second test case, the carrier frequencies are selected such that the left edge of the spectral band of the NB signal coincides with the 6 dB frequency of the wideband signal spectrum. Thus with the symbol rates of the two signals given by $R_{s1}=100$ Msps and $R_{s2}$ equal to 20 Msps, the center frequency offset $\Delta f_c$ of the narrowband signal is selected according to (41):

$$\Delta f_c=0.5 R_{s1}+(1+\alpha_2)R_{s2}/2=62.1 \text{ MHz} \quad (41)$$

The null bandwidth W of the combined signal is given by (42):

$$W=\Delta f_c+(1+\alpha_2)R_{s2}/2=74.2 \text{ MHz} \quad (42)$$

Alternatively the null bandwidth W may be expressed by (43):

$$W=0.5 R_{s1}+(1+\alpha_2)R_{s2} \quad (43)$$

The individual signal bandwidths ($W_1$ for the wideband signal and $W_2$ for the narrowband signal) are given by (44) and (45):

$$W_1=(1+\alpha_1)R_{s1}/2=65 \text{ MHz} \quad (44)$$

$$W_2=(1+\alpha_2)R_{s2}/2=12.1 \text{ MHz} \quad (45)$$

Thus with no spectral overlap, the requisite bandwidth would be $W_1+2W_2=89.2$ MHz, which is much higher than the 74.2 MHz used in the example while keeping the same data rate and results in a 20.2% increase in capacity measured in terms of sps/Hz. In fact, by selecting the narrowband symbol rate $R_{s2}$ equal to 12.39 Msps, the total bandwidth is equal to 65 MHz which is a the same as for the wideband signal alone. By placing a narrowband signal in each tail of the wideband signal, an additional symbol rate of $2R_{s2}=23.34$ Msps may be transmitted within the same bandwidth resulting in an increase of $2R_{s2}/R_{s1}=0.23$ or 23.34% increase in capacity. Additional increase is possible by increasing the overlap further. Also, it will be appreciated that different embodiments may exhibit properties similar to or different from those of the second test case. FIG. 12 shows a chart 1200 including a curve 1202 of the probability of bit error for the wideband signal denoted $P_{eW}$ versus $(E_b/N_0)_T$ for the second test case described above. The chart 1200 also shows curve 1204 of the ideal case. FIG. 13 shows a chart 1300 showing a curve 1302 of the corresponding probability of bit error $P_{eN}$ for the narrowband signal and the ideal curve 1304. The differential peak PSD of the narrowband signal $\Delta P_0$ is equal to 1 dB. The power sharing loss $P_{L1}$ for this case as computed from (37) is equal to 0.975 dB.

Figure 14:
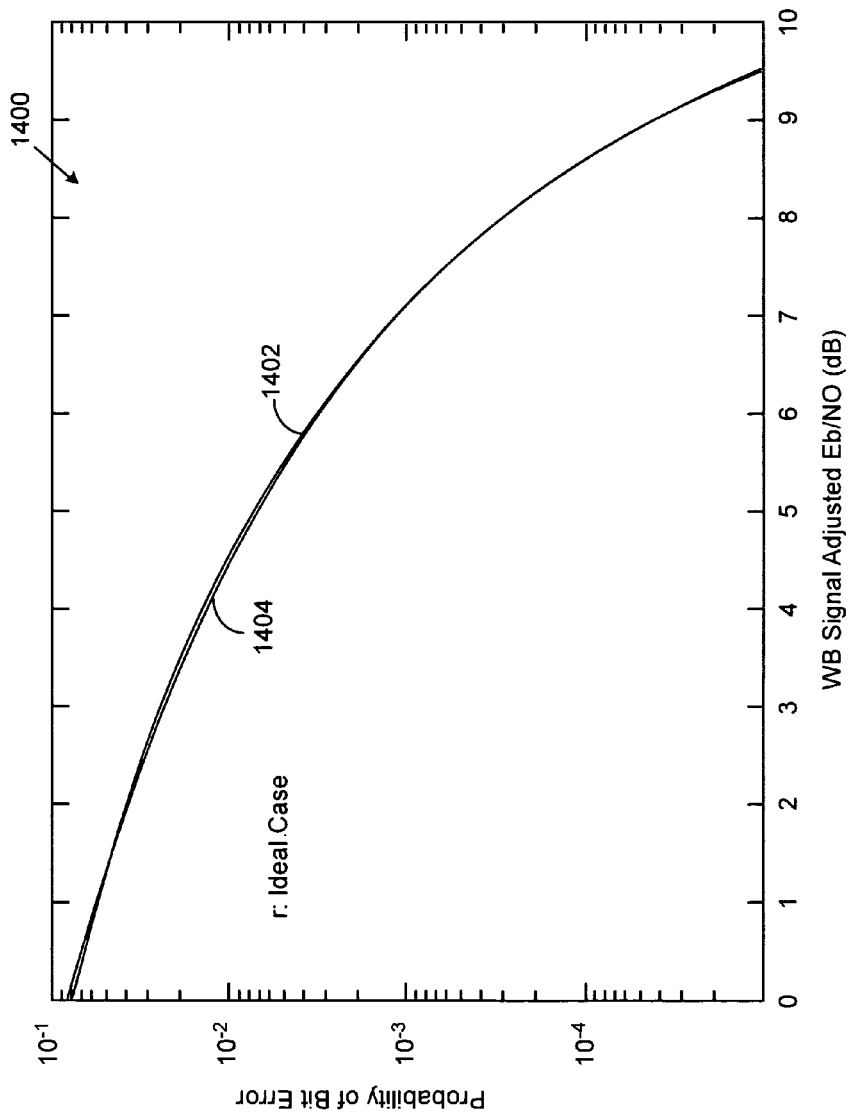
FIGS. 14 and 15 show charts of the probability of bit error results versus the $(E_b/N_o)_T$ adjusted by the power sharing loss $P_{L1}$=0.975 dB for the second test case.
Figure 15:
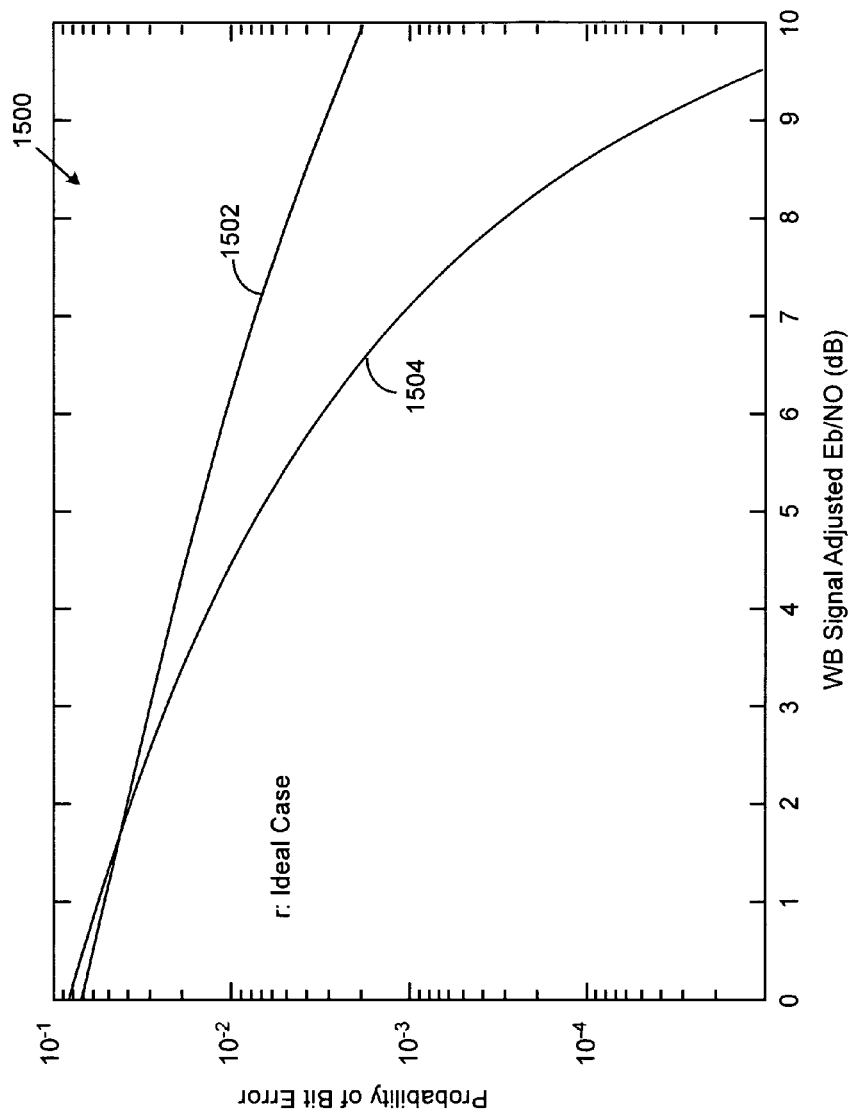

FIGS. 14 and 15 show charts 1400, 1500 of the probability of bit error results versus the $(E_b/N_0)_T$ adjusted by the power sharing loss $P_{L1}=0.975$ dB for the second test case (e.g., versus the $(E_b/N_0)_{WB}$). As may be inferred from FIG. 14, there is virtually no degradation in performance for the second test case curve 1402 compared to the ideal case curve 1404 assuming of no spectrum overlap. There is a significant degradation for the NB signal case, as demonstrated by the spread between the second test case curve 1502 and the ideal case curve 1504. For the case of powerful error correction codes, however, relatively high channel bit error rates are required and the performance may be adequate.

Performance may be further improved by increasing $\Delta \mathcal{P}_0$ as shown in the following. It is noted from the description above and from the simulation of the second test case that the performance difference between the wideband and narrowband signals arise as the wideband receiver demodulates the narrowband signal and uses the result for the narrowband signal to improve its own performance. In the second test case, however, the narrow band receiver ignored the presence of the wideband signal. This is reasonable when the two signals arise from different physical locations and are destined to different physical locations, as was assumed in the second test case. When the two signals are obtained by splitting a single wideband symbol stream, however, the same receiver will recover both signals. This may also be the case when two or more physical locations transmit to the same receiver. As described above, in this case, the wideband signal detected channel symbols may be fed back to improve the narrowband signal performance. In such embodiments, it is expected that the performance of the narrowband signal will be similar to that of the wideband signal (e.g., there will be negligible degradation due to spectrum overlap). The relative increase in the peak PSD of the narrowband signal $\Delta \mathcal{P}_0$ results in an overall increase in the transmit power or equivalently the $(E_b/N_0)$ requirement compared to the case of no such increase or equivalently for the case of no spectrum overlap. Denoting by $\Delta(E_b/N_0)$, such an increase may be given by (46):

$$\Delta(E_b/N_0) = 10 \log \{1 + [(10^{0.1\Delta\mathcal{P}_0} - 1) R_{s2}]/[R_{s1} + R_{s2}]\} \quad (46)$$

For the second test case, with $\Delta\mathcal{P}_0 = 1$ dB, $\Delta(E_b/N_0) = 0.18$ dB which is relatively small. When the wideband and narrowband signals arise from different physical locations, it is very likely that the narrowband receiver may have a relatively high receiver noise spectral density $N_0$ compared to that of the wideband receiver and thus will inherently require a higher relative $(E_b/N_0)$, thus implying no increase in $(E_b/N_0)$ due to spectral overlap.

Figure 16:
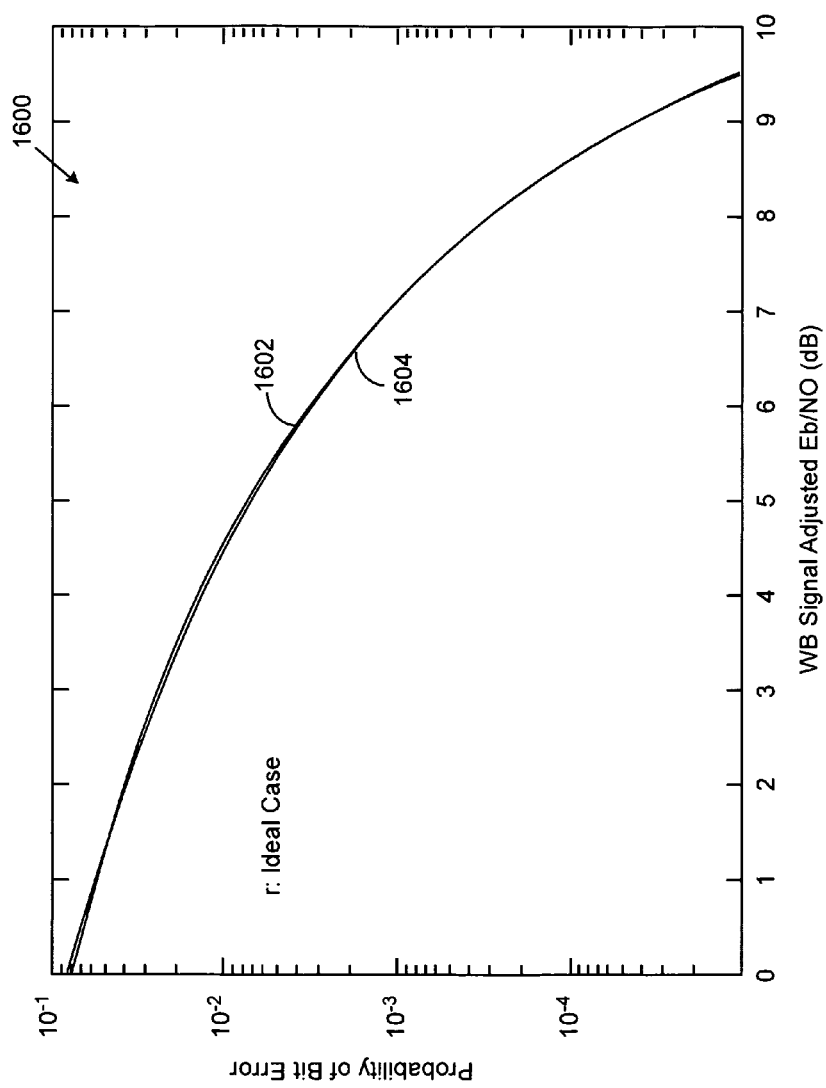
FIGS. 16 and 17 show charts of the performance results for a third test case similar to the second test case, but with $\Delta\mathcal{P}_0$=2 dB.
Figure 17:
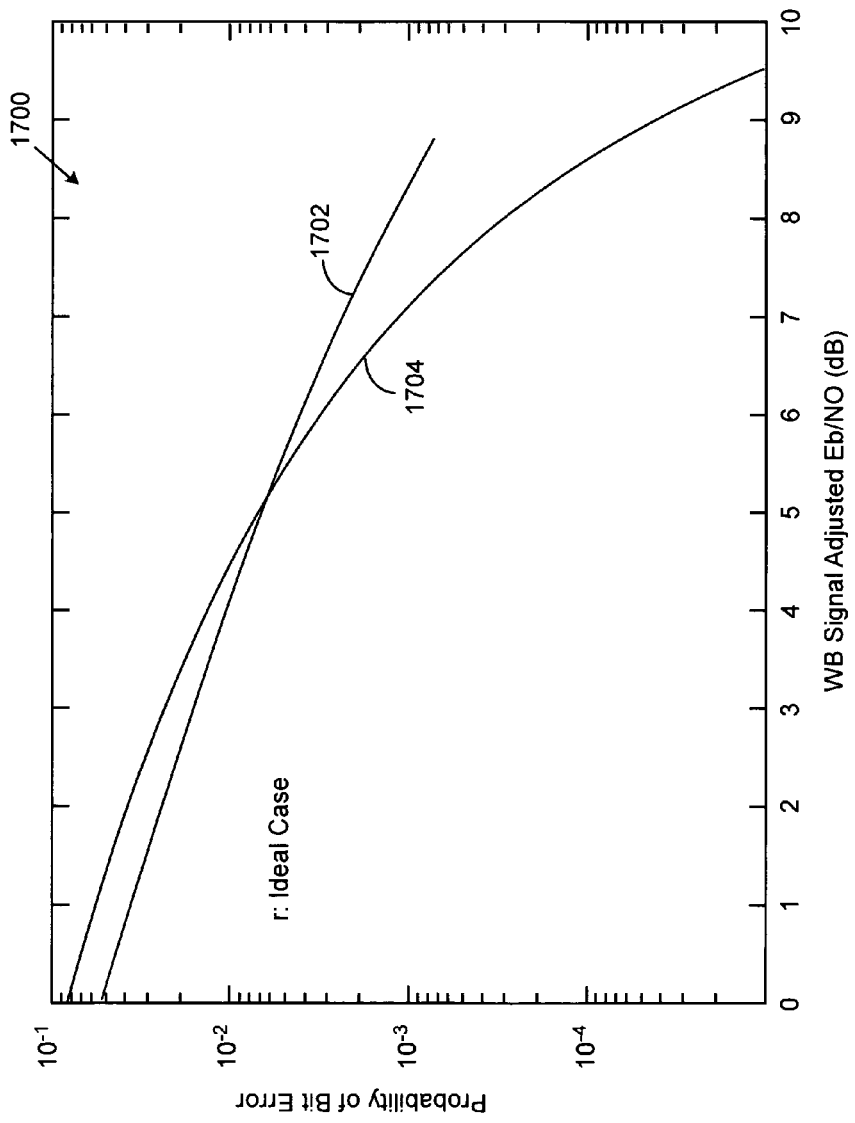

In order to increase the $P_e$ performance of the narrowband signal for the case when the narrowband signal is received by an independent receiver, the relative peak PSD of the narrowband signal $\Delta\mathcal{P}_0$ may be increased beyond 1 dB. FIG. 16 shows a chart 1600 of the performance results for a third test case similar to the second test case, but with $\Delta\mathcal{P}_0 = 2$ dB. In FIG. 16, a first curve 1602 shows the performance of the wideband signal while a second curve 1604 shows the ideal performance. FIG. 17 shows a chart 1700 having a first curve 1702 corresponding to the actual performance of the narrowband signal and a curve 1704 corresponding to the ideal performance.

The third test case illustrated in FIGS. 16 and 17 results in a power sharing loss $P_{L1}$ of 1.2 dB as computed from (37). The resulting increase in the $(E_b/N_0)$ requirement as computed from (44) is given by $\Delta(E_b/N_0) = 0.4$ dB. As may be inferred from FIG. 16, there is no penalty in terms of the required $(E_b/N_0)_{WB}$ as expected from the third test case where $\Delta\mathcal{P}_0 = 1$ dB. Also, the channel $P_{eN}$ can be satisfied for systems with most error correction coding schemes. In fact a $P_{eN}$ of $10^{-2}$ may be achieved even with a smaller value of $\Delta\mathcal{P}_0$ than 2 dB. Thus an increase of 20-24% in symbol rate may be achieved at the cost of a relatively small increase of 0.3 dB in the $(E_b/N_0)$ requirement. When the two symbol streams are generated by the same terminal, there is no meaningful performance degradation even with such an increase in the capacity (e.g., the capacity is increased at little cost in terms of $(E_b/N_0)$).

Figure 18:
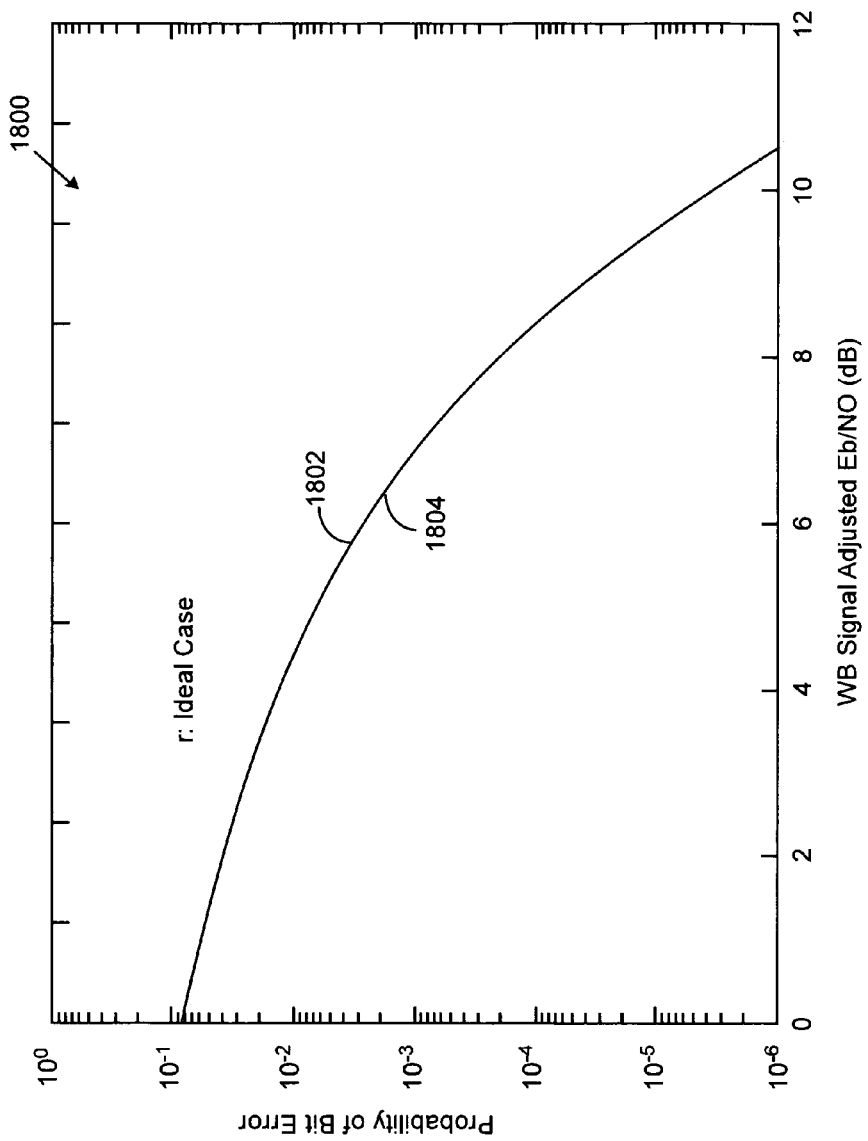
FIGS. 18 and 19 show charts of the performance results for a fourth test case where $\Delta\mathcal{P}_0$=3 dB.
Figure 19:
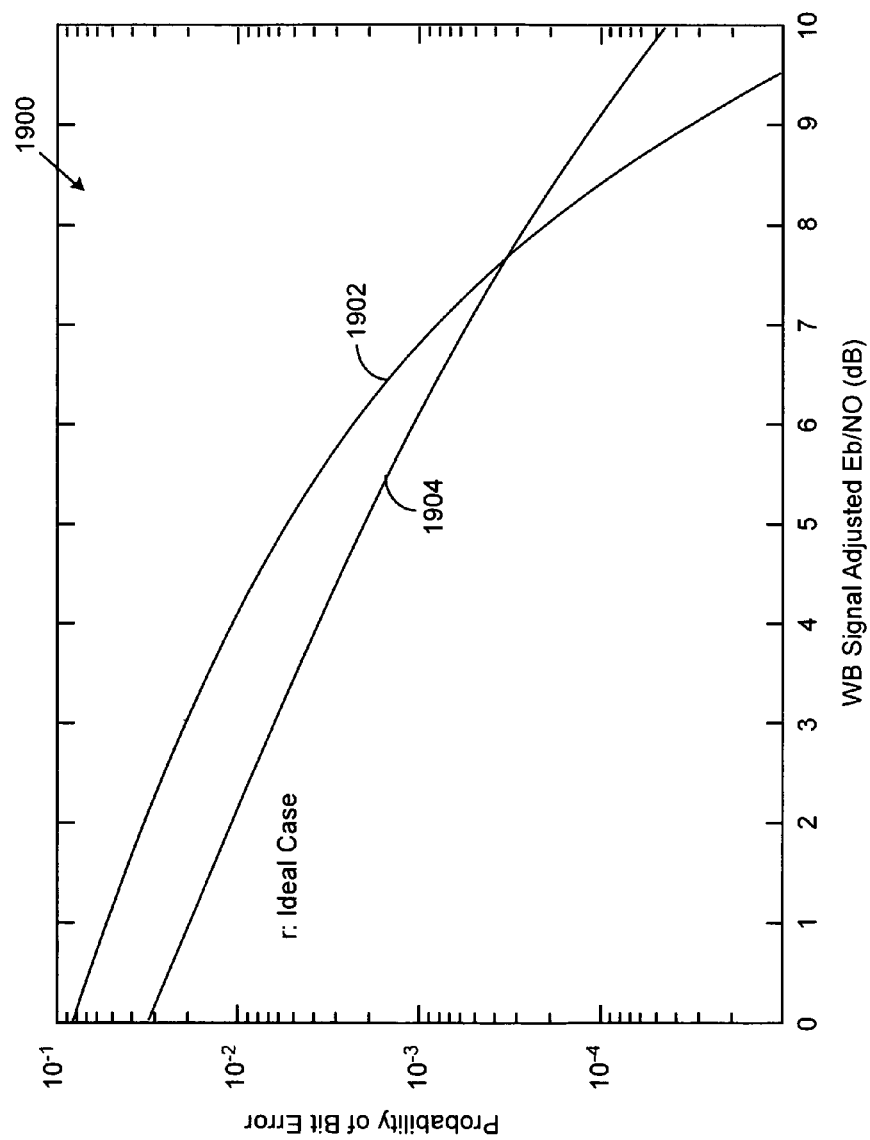

According to various embodiments, the performance of the narrowband can be further increased by increasing the value of $\Delta\mathcal{P}_0$ above 2 dB considered in third test case of FIGS. 16 and 17. For example, FIGS. 18 and 19 show charts of the performance results for a fourth test case where $\Delta\mathcal{P}_0 = 3$ dB. FIG. 18 shows a chart 1800 comprising a first curve 1802 illustrating the probability of bit error for the wideband signal, $P_{eW}$, versus the $(E_b/N_0)_{WB}$ for the fourth test case along with a plot 1804 of the ideal case. FIG. 19 shows a chart 1900 comprising a first curve 1902 showing the fourth test case result for the narrowband signal $P_{eN}$, as well as a curve 1904 showing the ideal narrowband case. As may be inferred from FIG. 19, a probability of bit error $P_{eN}$ of $10^{-2}$ may be achieved with a $(E_b/N_0)_{WB}$ of 2.6 dB. The corresponding $P_{eW}$ for a $(E_b/N_0)_{WB}$ of 2.6 dB is equal to 0.025 from FIG. 18, which is very close to the ideal case when only the wideband signal is present. Thus with an appropriate selection of $\Delta\mathcal{P}_0$ and $(E_b/N_0)_{WB}$ the $P_e$ requirements for both the wideband and the narrowband terminals may be satisfied. Selection of $\Delta\mathcal{P}_0 = 3$ dB results in an overall $(E_b/N_0)$ penalty of $\Delta(E_b/N_0) = 0.66$ dB.

Figure 20:
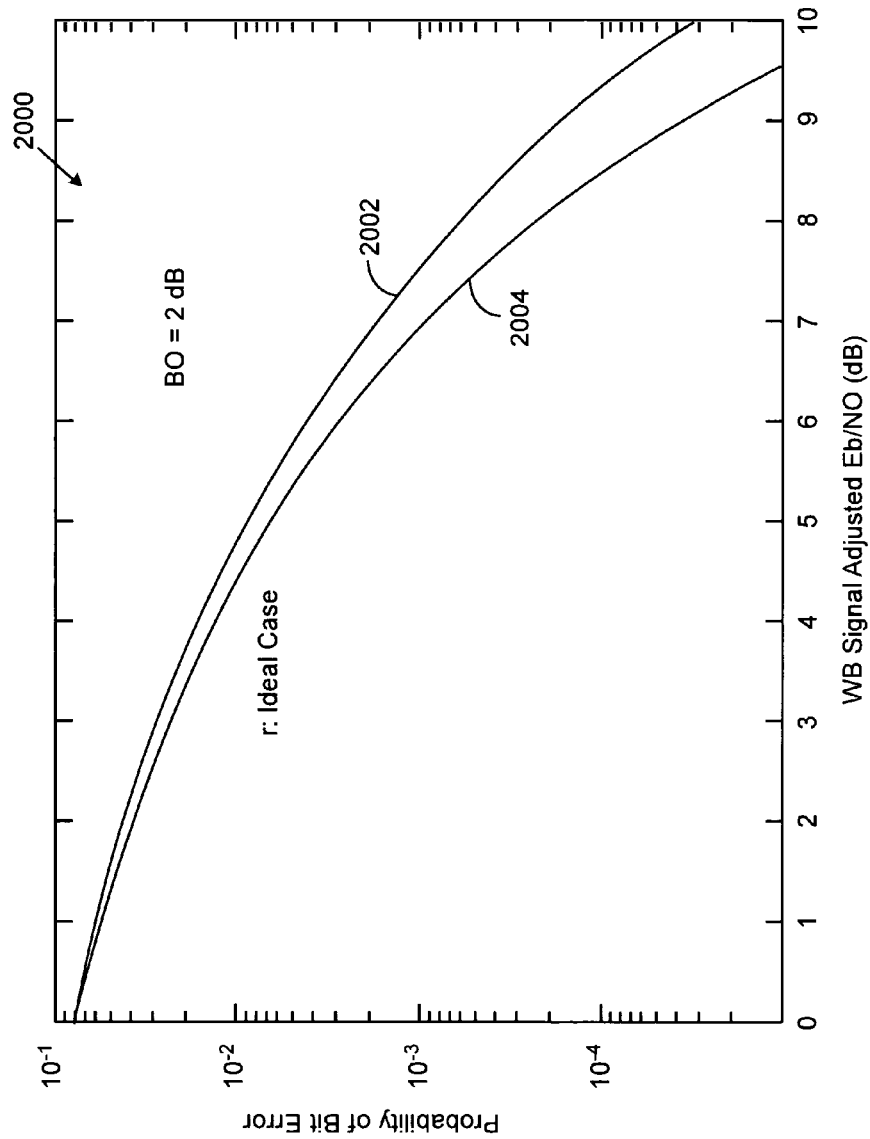
FIGS. 20 and 21 show the $P_e$ performance of one embodiment of the methods described herein in a fifth test case where the presence of power amplifier nonlinearities.
Figure 21:
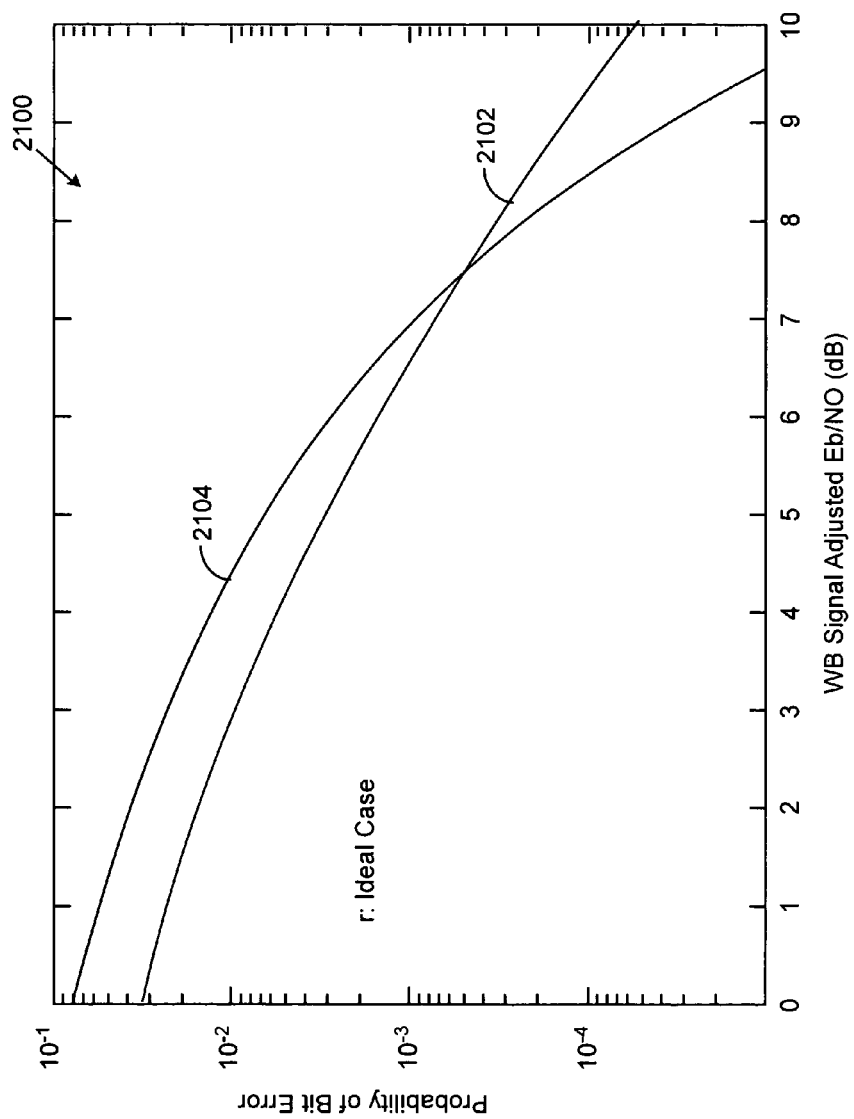

FIGS. 20 and 21 show the $P_e$ performance of one embodiment of the methods described herein in a fifth test case where the presence of power amplifier nonlinearities. In the fifth test case, the composite signal is amplified by an amplifier with a significant AM-AM distortion when the amplifier is operated with a 2 dB output back off and with $\Delta\mathcal{P}_0 = 3$ dB. FIG. 20 shows a chart 2000 comprising a curve 2002 showing the performance of the wideband signal and a curve 2004 showing the ideal performance. Similarly, FIG. 21 shows a chart 2100 comprising a curve 2102 showing the performance of the narrowband signal and a curve 2104 showing the ideal narrowband performance. Comparison of the results show in FIGS. 20 and 21 with those of FIGS. 18 and 19 shows that there is some degradation in performance as expected, however, the extent of degradation is about the same as that obtained when the two signals have no spectral overlap showing that the capacity advantage is maintained even with significant amplifier nonlinearities.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, the modules 400, 500, 600 and 800, or parts thereof, may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 2200 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 22:
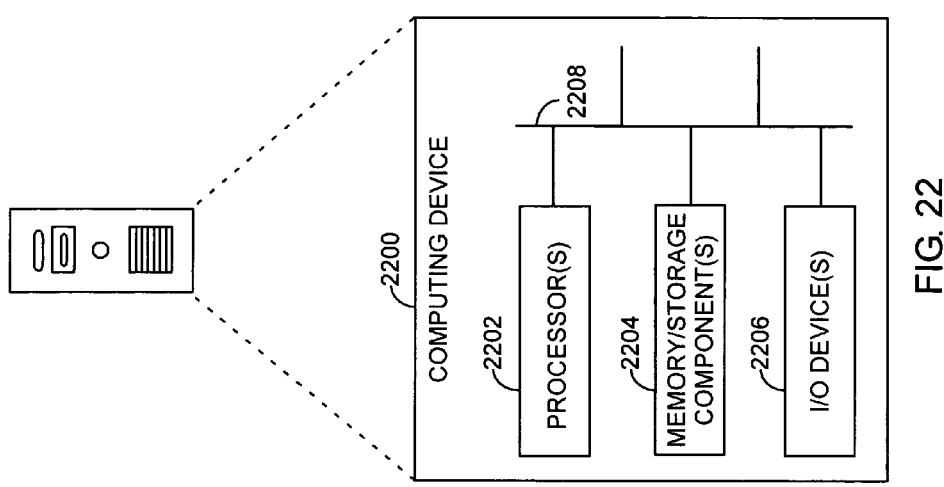
FIG. 22 shows one embodiment of an example computing device.

FIG. 22 shows an example of a computing device 2200 according to one embodiment. For the sake of clarity, the computing device 2200 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 22, the computing device 2200 comprises one or more processor circuits or processing units 2202, one or more memory circuits and/or storage circuit component(s) 2204 and one or more input/output (I/O) circuit devices 2206. Additionally, the computing device 2200 comprises a bus 2208 that allows the various circuit components and devices to communicate with one another. The bus 2208 represents one or more of any of several types of bus structures, including a memory bus or memory controller, a peripheral bus, an accelerated graphics port, and a processor or local bus using any of a variety of bus architectures. The bus 2208 may comprise wired and/or wireless buses. The processing unit 2202 may be responsible for executing various software programs such as system programs, applications programs, and/or program modules/blocks to provide computing and processing operations for the computing device 2200. The processing unit 2202 may be responsible for performing various voice and data communications operations for the computing device 2200 such as transmitting and receiving voice and data information over one or more wired or wireless communications channels. Although the processing unit 2202 of the computing device 2200 is shown in the context of a single processor architecture, it may be appreciated that the computing device 2200 may use any suitable processor architecture and/or any suitable number of processors in accordance with the described embodiments. In one embodiment, the processing unit 2202 may be implemented using a single integrated processor. The processing unit 2202 may be implemented as a host central processing unit (CPU) using any suitable processor circuit or logic device (circuit), such as a as a general purpose processor. The processing unit 2202 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 2202 may be coupled to the memory and/or storage component(s) 2204 through the bus 2208. The bus 2208 may comprise any suitable interface and/or bus architecture for allowing the processing unit 2202 to access the memory and/or storage component(s) 2204. Although the memory and/or storage component(s) 2204 may be shown as being separate from the processing unit 2202 for purposes of illustration, it is worthy to note that in various embodiments some portion or the entire memory and/or storage component(s) 2204 may be included on the same integrated circuit as the processing unit 2202. Alternatively, some portion or the entire memory and/or storage component(s) 2204 may be disposed on an integrated circuit or other medium (e.g., hard disk drive) external to the integrated circuit of the processing unit 2202. In various embodiments, the computing device 2200 may comprise an expansion slot to support a multimedia and/or memory card, for example. The memory and/or storage component(s) 2204 represent one or more computer-readable media. The memory and/or storage component(s) 2204 may be implemented using any computer-readable media capable of storing data such as volatile or non-volatile memory, removable or non-removable memory, erasable or non-erasable memory, writeable or re-writeable memory, and so forth. The memory and/or storage component(s) 2204 may comprise volatile media (e.g., random access memory (RAM)) and/or nonvolatile media (e.g., read only memory (ROM), Flash memory, optical disks, magnetic disks and the like). The memory and/or storage component(s) 2204 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 2206 allow a user to enter commands and information to the computing device 2200, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 2200 may comprise an alphanumeric keypad coupled to the processing unit 2202. The keypad may comprise, for example, a QWERTY key layout and an integrated number dial pad. The computing device 2200 may comprise a display coupled to the processing unit 2202. The display may comprise any suitable visual interface for displaying content to a user of the computing device 2200. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 2202 may be arranged to provide processing or computing resources to the computing device 2200. For example, the processing unit 2202 may be responsible for executing various software programs including system programs such as operating system (OS) and application programs. System programs generally may assist in the running of the computing device 2200 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 2200 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

I claim:

1. A transmitter system comprising:
a transmitter comprising at least one processor and operatively associated memory, wherein the transmitter is programmed to implement:
a data splitter to receive an input data signal and to split the signal into a first signal and a second signal, wherein the first signal is a wideband signal and the second signal is a narrowband signal;
a first baseband modulator to receive the first signal and to generate a baseband modulated first signal, wherein a bandwidth of the baseband modulated first signal is centered at a center frequency;
a second baseband modulator to receive the second signal and to generate a baseband modulated second signal;
a subcarrier modulator to receive the baseband modulated second signal and to shift the bandwidth of the baseband modulated second signal by an offset frequency to generate a shifted second signal; and
a signal combiner to combine the baseband modulated first signal and the shifted second signal to generate a composite signal, wherein the offset frequency is offset from the center frequency such that after combination of the baseband modulated first signal and the shifted second signal, at least a portion of the bandwidth of the shifted second signal overlaps a skirt of the bandwidth of the baseband modulated first signal; and
a receiver comprising at least one processor and operatively associated memory, wherein the receiver is programmed to:
receive the composite signal and implement:
reproduce the first signal from the composite signal by canceling interference in the first signal due to the second signal considering the second signal estimate; and
derive a second signal estimate from the composite signal.

2. The system of claim 1, wherein the at least one processor is further programmed to implement:
a baseband to intermediate frequency converter to upconvert the composite signal to an intermediate frequency signal; and
an intermediate frequency to RF converter to upconvert the intermediate frequency signal to a radio frequency (RF) signal.

3. The system of claim 1, wherein the at least one processor is further programmed to provide the composite signal to a digital-to-analog converter to generate an analog composite signal and further comprising:
a baseband to intermediate frequency converter to upconvert the analog composite signal to an analog intermediate frequency signal; and
an intermediate frequency to RF converter to upconvert the analog intermediate frequency signal to an analog radio frequency (RF) signal.

4. The system of claim 1, wherein the transmitter further comprises:
an amplifier to amplify the RF signal; and
an antenna for transmitting the amplified RF signal.

5. The system of claim 1, wherein the skirt of the first signal is a frequency band where the first signal's power spectral density drops from 6 dB from peak spectral power density to zero.

6. The system of claim 1, wherein the first baseband modulator and the second baseband modulator are configured to modulate the respective signals according to at least one technique selected from the group consisting of an Offset Quadrature Phase Key Shifting (OQPSK) technique, a Multiple Quadrature Amplitude Modulation (MQAM) technique, and a Multiple Phase Shift Keying (MPSK) technique.

7. The system of claim 6, wherein the first baseband modulator is configured to:
receive the first signal;
convert the first signal from a serial to a parallel signal;
generate a quadrature first signal by delaying the parallel first signal by one period of the first signal; and
apply a real-to-complex converter to the quadrature signal and the parallel first signal, wherein the parallel first signal corresponds to an inphase signal.

8. A method for preparing a signal for transmission, the method comprising:
a transmitter receiving an input signal, wherein the transmitter comprises a processor and operatively associated memory;
the transmitter splitting the input signal into a first signal and a second signal;
the transmitter modulating the first signal to generate a baseband modulated first signal, wherein a bandwidth of the baseband modulated first signal is centered at the center frequency;
the transmitter modulating the second signal to generate a baseband modulated second signal;
the transmitter shifting the bandwidth of the baseband modulated second signal by an offset frequency to generate a shifted second signal; and
the transmitter combining the baseband modulated first signal and the shifted second signal to generate a composite signal, wherein the offset frequency is offset from the center frequency such that after combination of the baseband modulated first signal and the shifted second signal, at least a portion of the bandwidth of the shifted second signal overlaps a skirt of the bandwidth of the baseband modulated first signal;
a receiver receiving the composite signal, wherein the receiver comprises a processor and operatively associated memory;
the receiver deriving a second signal estimate from the composite signal;
the receiver reproducing the first signal from the composite signal by canceling interference in the first signal due to the second signal considering the second signal estimate; and
the receiver reproducing the second signal from the composite by canceling interference in the composite signal considering the reproduced first signal.

9. A signal processing system for processing compressed bandwidth signals, the system comprising:
a first computer device comprising a processor and operatively associated memory, wherein the first computer device is programmed to:
receive a first signal, wherein the first signal comprises a first component and a second component, wherein a bandwidth of the first component is centered at a center frequency and wherein a bandwidth of the second component is offset from the center frequency by an offset frequency such that at least a portion of the bandwidth of the second component overlaps a skirt of the first component;

downconvert the first signal to a baseband signal;

derive a complex baseband signal corresponding to the first signal;

filtering the complex baseband signal to generate a second component reference signal;

derive a second component estimate based on the complex baseband signal and the second component reference signal;

reproduce the first component by canceling interference in the first signal due to the second component considering the second component estimate; and reproduce the second component by canceling interference in the first signal due to the second signal considering the reproduced first component.

10. The system of claim 9, wherein the downconverting comprises:

mixing the first signal with a local RF oscillator signal;

filtering the resulting signal with an intermediate frequency (IF) bandpass filter; and applying an IF to baseband downconverter to the filtered signal.

11. The system of claim 9, wherein deriving the second component estimate comprises:

filtering the complex baseband signal;

generating a first second component reference signal based on the output of the first complex baseband filter, wherein the generating utilizes a carrier phase tracking loop; and when the offset frequency is positive, deriving a complex conjugate of the first second component reference signal.

12. The system of claim 11, wherein filtering the complex baseband signal comprises applying a first real bandpass filter and a second filter having a frequency response equal to a Hilbert transform of a frequency response of the real bandpass filter.

13. The system of claim 12, wherein the frequency response of the real bandpass filter defines a bandpass region according to:

$$-B_{T2}/2 \leq ||f| - \Delta f_{c2}| < B_{T2}/2$$

wherein $B_{T2}$ is the bandwidth of the second signal, and $\Delta f_{c2}$ is the offset frequency and f is a frequency variable defining a band for which the center frequency is equal to the offset frequency $\Delta f_{c2}$.

14. The system of claim 11, wherein reproducing the first component comprises:

applying a first demodulator to demodulate the complex baseband signal with the first second component reference signal;

applying a first modulator to shift the bandwidth of the output of the demodulator to the offset frequency;

applying a first amplifier for multiplying the output of the modulator by a second signal gain adjust factor to generate a second component estimate;

applying a first summing junction to subtract the second component estimate from the complex baseband signal to generate an interference compensated first signal;

applying a first phase corrector to multiply the compensated first signal by a phase error estimate;

applying a complex-to-real converter to convert the phase corrected, compensated first signal to an in-phase component and a quadrature component;

applying a pair of filters and samplers to convert the inphase and quadrature components in to a filtered inphase component and a filtered quadrature component;

applying a first delay module to delay the filtered inphase component by one half of a symbol period of the first component;

applying a parallel-to-serial converter to receive the delayed, filetered inphase component and the filtered quadrature component and generate an output component;

applying a soft limiter to quantize the output component; and applying an error correction decoder to receive the output component and output the first component.

15. The system of claim 9, wherein the first computer device is programmed to implement:

a first estimator module to generate a first component estimate;

a second module to derive the second component from the complex baseband signal considering the first component estimate.

16. The system of claim 9, wherein the first signal further comprises a second second signal having a bandwidth offset from the center frequency by a second offset frequency such that at least a portion of the bandwidth of the second second component overlaps a second skirt of the first component.

17. The system of claim 9, wherein the skirt of the first signal is a frequency band where the first signal's power spectral density drops from 6 dB from peak spectral power density to zero.

18. The system of claim 9, wherein the downconverting comprises demodulating the respective signals according to at least one technique selected from the group consisting of an Offset Quadrature Phase Key Shifting (OQPSK) technique, a Multiple Quadrature Amplitude Modulation (MQAM) technique, and a Multiple Phase Shift Keying (MPSK) technique.

19. The system of claim 9, wherein the first component is a wideband component and the second component is a narrowband component.

20. A method for processing a first signal, the method comprising:

a first computer device a first signal, wherein the first signal comprises a first component and a second component, wherein a bandwidth of the first component is centered at a center frequency and wherein a bandwidth of the second component is offset from the center frequency by an offset frequency such that at least a portion of the bandwidth of the second component overlaps a skirt of the first component;

the first computer device downconverting the first signal to a baseband signal;

the first computer device deriving a complex baseband signal corresponding to the first signal;

the first computer device filtering the complex baseband signal to generate a second component reference signal;

the first computer device deriving a second component estimate based on the complex baseband signal and the second component reference signal; and the first computer device reproducing the first component by canceling interference in the first signal due to the second component considering the second component estimate.

21. The system of claim 19, wherein the first component is modulated according to an Offset Quadrature Phase Key Shifting (OQPSK) technique and wherein the second component is modulated according to an Eight Phase Shift Keying (8PSK) technique.

22. A system for processing a received signal, the system comprising:
- a first computer device comprising a processor and operatively associated memory, wherein the first computer device is programmed to implement:
    - a downconverter to downconvert the received signal to a baseband signal, wherein the received signal comprises a first component and a second component, wherein a bandwidth of the first component is centered at a center frequency and wherein a bandwidth of the second component is offset from the center frequency by an offset frequency such that at least a portion of the bandwidth of the second component overlaps a skirt of the first component;
    - a second component estimator module to derive a second component estimate from the baseband signal; and
    - a first component estimator module to cancel interference in the first component due to the second component considering the second component estimate, wherein the first component estimator module comprises:
        - a first demodulator to demodulate the complex baseband signal with the first second component reference signal;
        - a first modulator to shift the bandwidth of the output of the demodulator to the offset frequency;
        - a first amplifier for multiplying the output of the modulator by a second signal gain adjust factor to generate a second component estimate;
        - a first summing junction to subtract the second component estimate from the complex baseband signal to generate an interference compensated first signal;
        - a first phase corrector to multiply the compensated first signal by a phase error estimate;
        - a complex-to-real converter to convert the phase corrected, compensated first signal to an in-phase component and a quadrature component;
        - a pair of filters and samplers to convert the inphase and quadrature components in to a filtered inphase component and a filtered quadrature component;
        - a first delay module to delay the filtered inphase component by one half of a symbol period of the first component;
        - a parallel-to-serial converter to receive the delayed, filetered inphase component and the filtered quadrature component and generate an output component;
        - a soft limiter to quantize the output component; and
        - an error correction decoder to receive the output component and output the first component.

* * * * *